US010356747B2

(12) United States Patent
Li

(10) Patent No.: US 10,356,747 B2
(45) Date of Patent: Jul. 16, 2019

(54) PAGING METHOD, RELATED DEVICE, AND SYSTEM

(71) Applicant: Huawei Technologies Co., Ltd., Shenzhen, Guangdong (CN)

(72) Inventor: Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 133 days.

(21) Appl. No.: 15/473,367

(22) Filed: Mar. 29, 2017

(65) Prior Publication Data
US 2017/0208567 A1 Jul. 20, 2017

Related U.S. Application Data

(63) Continuation of application No. PCT/CN2014/088025, filed on Sep. 30, 2014.

(51) Int. Cl.
H04W 80/04 (2009.01)
H04W 68/02 (2009.01)
H04L 12/741 (2013.01)
H04W 68/00 (2009.01)

(52) U.S. Cl.
CPC .......... H04W 68/02 (2013.01); H04L 45/74 (2013.01); H04W 68/005 (2013.01)

(58) Field of Classification Search
CPC ..... H04W 80/04; H04W 84/12; H04W 88/06; H04W 88/08; H04W 84/18
See application file for complete search history.

(56) References Cited

U.S. PATENT DOCUMENTS

| 2010/0271949 | A1* | 10/2010 | Yoon | H04W 8/12 370/235 |
| 2011/0098051 | A1 | 4/2011 | Kamalaraj et al. | |
| 2012/0057496 | A1* | 3/2012 | Jin | H04W 68/00 370/252 |
| 2012/0320876 | A1* | 12/2012 | Zhou | H04W 36/12 370/331 |
| 2013/0155963 | A1* | 6/2013 | Cillis | H04W 4/12 370/329 |
| 2013/0155972 | A1* | 6/2013 | Cillis | H04W 4/12 370/329 |
| 2014/0016545 | A1* | 1/2014 | Jaiswal | H04L 69/22 370/328 |

(Continued)

FOREIGN PATENT DOCUMENTS

CN 101001449 A 7/2007
CN 101043703 A 9/2007
(Continued)

Primary Examiner — Hassan A Phillips
Assistant Examiner — Prenell P Jones

(57) ABSTRACT

Embodiments of the present invention disclose a paging method, a related device, and a system. The paging method includes: receiving, by a forwarding plane gateway, a downlink packet; and sending, by the forwarding plane gateway, a second paging message to at least one base station according to the downlink packet, where the second paging message is used for paging a terminal. In the paging method in the present invention, the forwarding plane gateway sends the second paging message to page the terminal, and a control plane gateway is not required to page the terminal.

16 Claims, 16 Drawing Sheets

(56) References Cited

U.S. PATENT DOCUMENTS

| | | | | |
|---|---|---|---|---|
| 2016/0080260 A1* | 3/2016 | Wang | ............... | H04L 67/025 370/392 |
| 2016/0094398 A1* | 3/2016 | Choudhury | ............ | H04L 45/42 370/254 |
| 2016/0150448 A1* | 5/2016 | Perras | ................ | H04W 36/12 455/450 |
| 2016/0150449 A1* | 5/2016 | He | ................ | H04W 36/0038 370/331 |
| 2016/0165573 A1 | 6/2016 | Jin et al. | | |
| 2016/0197831 A1* | 7/2016 | De Foy | ............. | H04L 45/7453 370/392 |

FOREIGN PATENT DOCUMENTS

| | | |
|---|---|---|
| CN | 101064948 A | 10/2007 |
| CN | 101094510 A | 12/2007 |
| CN | 102970750 | 3/2013 |
| CN | 103857038 A | 6/2014 |
| CN | 102369741 B | 2/2015 |
| EP | 2432287 A1 | 3/2012 |
| EP | 2753135 A1 | 7/2014 |
| JP | 2012527133 A | 11/2012 |
| WO | 2007039757 A2 | 4/2007 |
| WO | 2011023090 A1 | 3/2011 |
| WO | 2013076455 A1 | 5/2013 |

\* cited by examiner

PAGING METHOD, RELATED DEVICE, AND SYSTEM

CROSS-REFERENCE TO RELATED APPLICATIONS

This application is a continuation of International Patent Application No. PCT/CN2014/088025 filed on Sep. 30, 2014. The disclosure of the aforementioned application is hereby incorporated by reference in the entirety.

TECHNICAL FIELD

The present invention relates to the field of communications technologies, and in particular, to a paging method, a related device, and a system.

BACKGROUND

As shown in FIG. 1, an evolved network system includes a terminal (User Equipment, UE), a radio access network (RAN), a control plane gateway (GW-C), a forwarding plane gateway (GW-U), and a mobility management network element. The mobility management network element includes a mobility management entity (MME) and/or a serving general packet radio service support node (SGSN). The mobility management entity is used to authenticate the UE, and after the authentication, instruct the control plane gateway to set up a bearer used for user data transmission. The control plane gateway is used to process interface signaling. The forwarding plane gateway is used to forward data, and the forwarding plane gateway is further used to: receive downlink data of a packet data network (PDN), send the downlink data to the UE by using the bearer, and send, to a corresponding PDN, uplink data from the UE. In the evolved network system, the control plane gateway is separated from the forwarding plane gateway. For example, the control plane gateway is deployed in a central city, and forwarding plane gateways are separately deployed in surrounding areas of the central city.

As shown in FIG. 2, based on the evolved network system, a procedure of an existing paging method includes the following steps.

101. Release a wireless connection.

Specifically, UE releases a wireless connection between the UE and an evolved NodeB (eNB) eNB a. After releasing the wireless connection, the UE enters an idle (IDLE) state.

102. Release context of UE.

Specifically, the eNB a and the MME release the context of the UE. The MME maintains a current location area of the UE. Each location area includes one or more eNBs.

103. Release an access bearer.

Specifically, the MME instructs a GW-C to release a bearer between a GW-U and the eNB a.

104. Modify a forwarding table.

Specifically, the GW_C modifies a user IP forwarding table that is for the UE. The GW_C instructs, by using a standard control forwarding decoupling interface, the GW-U to modify the user IP forwarding table, stop sending a general packet radio service (GPRS) tunneling protocol forwarding plane (GTP-U) packet to the base station, buffer a user downlink packet, and report an event. The decoupling interface may be an interface that is based on an industry-defined interface protocol such as Open flow, I2RS, or FORCES.

105. Update a tracking area.

If the UE moves to a new location area, the UE initiates a location update procedure and notifies an MME of the new location area of the UE.

106. Buffer a downlink packet.

Specifically, the GW-U receives a downlink packet from a packet data network, and buffers the downlink packet according to an instruction of the user IP forwarding table.

107. Send a downlink packet arrival event.

The GW-U sends the downlink packet arrival event to the GW-C according to the instruction of the IP forwarding table.

108. A GW-C sends a downlink data notification to an MME.

109. The MME sends a paging message to a base station.

Specifically, the MME sends the paging message to all base stations in the location area according to the stored current location area of the UE. All the base stations include an eNB b and an eNB c.

110. The UE sends a service request to an eNB b.

111. The eNB b forwards the service request to the MME.

112. The MME instructs the eNB b to set up user context.

113. The eNB b establishes a wireless connection to the UE.

114. The MME instructs the GW-C to set up a GTP-U tunnel between a GW-U and the base station.

115. The GW-C instructs the GW-U to modify a user IP forwarding table action.

116. Set up a bearer and send the downlink packet to the UE.

The GW-U encapsulates the packet into the GTP-U tunnel and sends the encapsulated packet to a corresponding base station, so that an end-to-end transmission path is created between the GW-U and the UE, that is, a bearer between the GW-U and the UE is set up. The downlink packet buffered by the GW-U is sent to the UE by using the transmission path.

Because a control plane gateway is separated from a forwarding plane gateway, control plane gateways are deployed in a centralized manner, and forwarding plane gateways are deployed in a distributed manner, the control plane gateway is far away from the forwarding plane gateway, there is frequent signaling interworking between the control plane gateway and the forwarding plane gateway, and this takes a relative long time. For example, the control plane gateway is deployed in a central city, and forwarding plane gateways are separately deployed in surrounding areas of the central city. After a downlink packet arrives at a forwarding plane gateway, the forwarding plane gateway needs to inform the control plane gateway. Consequently, message forwarding is circuitous and a paging time is increased.

SUMMARY

An objective of the present invention is to provide a paging method, a related device, and a system. The paging method is used to reduce signaling interworking between a control plane gateway and a forwarding plane gateway.

A first aspect of embodiments of the present invention provides a paging method, including:

receiving, by a forwarding plane gateway, a downlink packet; and sending, by the forwarding plane gateway, a second paging message to at least one base station according to the downlink packet, where the second paging message is used for paging a terminal.

With reference to the first aspect of the embodiments of the present invention, in a first implementation manner of the first aspect of the embodiments of the present invention, before the receiving, by a forwarding plane gateway, a downlink packet, the method further includes:

receiving, by the forwarding plane gateway, a first paging message sent by a control plane gateway; and the sending, by the forwarding plane gateway, a second paging message to at least one base station according to the downlink packet includes:

determining, by the forwarding plane gateway, a destination address of the second paging message according to a destination address of the downlink packet, and sending the second paging message to the at least one base station according to the destination address of the second paging message.

With reference to the first implementation manner of the first aspect of the embodiments of the present invention, in a second implementation manner of the first aspect of the embodiments of the present invention, before the receiving, by a forwarding plane gateway, a downlink packet, the method further includes:

receiving, by the forwarding plane gateway, a group entry and an IP processing entry that are sent by the control plane gateway; and the determining, by the forwarding plane gateway, a destination address of the second paging message according to a destination address of the downlink packet, and sending the second paging message to the at least one base station according to the destination address of the second paging message includes:

determining, by the forwarding plane gateway according to the destination address of the downlink packet, a group entry that is in the IP processing entry and corresponding to the destination address of the downlink packet, and executing an action entry of the group entry, where the action entry includes the destination address of the second paging message;

changing, by the forwarding plane gateway, the first paging message to the second paging message according to the action entry corresponding to the group entry; and sending, by the forwarding plane gateway, the second paging message to the at least one base station.

With reference to the second implementation manner of the first aspect of the embodiments of the present invention, in a third implementation manner of the first aspect of the embodiments of the present invention, the changing, by the forwarding plane gateway, the first paging message to the second paging message according to the action entry corresponding to the group entry includes:

changing a destination address of the first paging message to the destination address, included in the action entry, of the second paging message, where the second paging message is the first paging message whose destination address has been changed according to the action entry.

With reference to the paging method according to any one of the first implementation manner of the first aspect of the embodiments of the present invention to the third implementation manner of the first aspect of the embodiments of the present invention, in a fourth implementation manner of the first aspect of the embodiments of the present invention, the IP processing entry includes a match entry and a group entry identifier, the match entry is used to match the IP processing entry according to the destination address of the downlink packet, and the group entry identifier is used to indicate a correspondence between the group entry and the IP processing entry.

With reference to the paging method according to any one of the first aspect of the embodiments of the present invention to the fourth implementation manner of the first aspect of the embodiments of the present invention, in a fifth implementation manner of the first aspect of the embodiments of the present invention, the method further includes:

buffering, by the forwarding plane gateway, the downlink packet when receiving the downlink packet.

With reference to the paging method according to any one of the first implementation manner of the first aspect of the embodiments of the present invention to the fourth implementation manner of the first aspect of the embodiments of the present invention, in a sixth implementation manner of the first aspect of the embodiments of the present invention, the IP processing entry further includes a content storage entry, and the content storage entry is used to store the first paging message in the storage entry.

With reference to the paging method according to any one of the first aspect of the embodiments of the present invention to the sixth implementation manner of the first aspect of the embodiments of the present invention, in a seventh implementation manner of the first aspect of the embodiments of the present invention, after the sending, by the forwarding plane gateway, a second paging message to at least one base station according to the downlink packet, the method further includes:

reporting, by the forwarding plane gateway, a paging timeout event to the control plane gateway when the forwarding plane gateway does not receive, within a preset time, an instruction sent by the control plane gateway for setting the IP processing entry, so that the control plane gateway sends, to the forwarding plane gateway, an instruction for deleting the IP processing entry of the terminal, where the instruction for setting the IP processing entry is correspondingly generated by the control plane gateway according to a paging response message sent by the terminal, and the paging response message is correspondingly generated by the terminal according to the second paging message; and receiving, by the forwarding plane gateway, the instruction sent by the control plane gateway for deleting the IP processing entry of the terminal, deleting the IP processing entry of the terminal according to the instruction for deleting the IP processing entry of the terminal, and releasing the downlink packet.

With reference to the paging method according to any one of the first aspect of the embodiments of the present invention to the seventh implementation manner of the first aspect of the embodiments of the present invention, in an eighth implementation manner of the first aspect of the embodiments of the present invention, base station information corresponding to the terminal is an address of a base station in one or more location areas, and the one or more location areas include a current location area of the terminal.

With reference to the eighth implementation manner of the first aspect of the embodiments of the present invention, in a ninth implementation manner of the first aspect of the embodiments of the present invention, the location area includes a tracking area in a mobile network.

A second aspect of embodiments of the present invention provides a paging method, including:

sending, by a control plane gateway, a group entry and an IP processing entry to a forwarding plane gateway, where the group entry is corresponding to the IP processing entry; and sending, by the control plane gateway, a first paging message to the forwarding plane gateway, so that the forwarding plane gateway changes the first paging message to a second paging message according to the group entry and the IP processing entry, where the second paging message is used for paging a terminal.

With reference to the second aspect of the embodiments of the present invention, in a first implementation manner of the second aspect of the embodiments of the present invention, the group entry includes an action entry and a group entry identifier that is used to index the group entry, the action entry is used to instruct the forwarding plane gateway to change the first paging message to the second paging message, so that a destination address of the first paging message is changed to a destination address, included in the action entry, of the second paging message, where the second paging message is the first paging message whose destination address has been changed according to the action entry, and the action entry includes the destination address of the second paging message, so that the forwarding plane gateway sends the second paging message to the at least one base station according to the destination address of the second paging message.

With reference to the first implementation manner of the second aspect of the embodiments of the present invention, in a second implementation manner of the second aspect of the embodiments of the present invention, the IP processing entry includes a match entry and the group entry identifier, the match entry is used to enable the forwarding plane gateway to match the IP processing entry according to a destination address of the downlink packet, and the group entry identifier is used to indicate a correspondence between the group entry and the IP processing entry.

With reference to the second aspect of the embodiments of the present invention to the second implementation manner of the second aspect of the embodiments of the present invention, in a third implementation manner of the second aspect of the embodiments of the present invention, the IP processing entry further includes a content storage entry, and the content storage entry is used to instruct the forwarding plane gateway to store the first paging message in the storage entry.

With reference to the second aspect of the embodiments of the present invention to the third implementation manner of the second aspect of the embodiments of the present invention, in a fourth implementation manner of the second aspect of the embodiments of the present invention, after the sending, by the control plane gateway, a first paging message to the forwarding plane gateway, the method further includes:

sending, to the forwarding plane gateway by the control plane gateway, an instruction for setting the IP processing entry, so that the forwarding plane gateway sets the action entry to outer tunnel encapsulation according to the instruction for setting the IP processing entry.

With reference to the second aspect of the embodiments of the present invention to the third implementation manner of the second aspect of the embodiments of the present invention, in a fifth implementation manner of the second aspect of the embodiments of the present invention, after the sending, by the control plane gateway, a first paging message to the forwarding plane gateway, the method further includes:

if the control plane gateway receives a paging timeout event sent by the forwarding plane gateway, sending, to the forwarding plane gateway by the control plane gateway, an instruction for deleting the IP processing entry, so that the forwarding plane gateway deletes the IP processing entry, where the paging timeout event is generated when the forwarding plane gateway does not receive, within a preset time, an instruction for setting the IP processing entry, and the instruction for setting the IP processing entry is used to instruct the forwarding plane gateway to set the action entry to outer tunnel encapsulation.

With reference to the second aspect of the embodiments of the present invention to the fifth implementation manner of the second aspect of the embodiments of the present invention, in a sixth implementation manner of the second aspect of the embodiments of the present invention, the method further includes:

if the control plane gateway determines that the terminal moves from a current location area to an updated location area, modifying, by the control plane gateway, an IP processing entry that is corresponding to the terminal located in the updated location area, so that the terminal located in the updated location area can be paged by using a group entry that is corresponding to the modified IP processing entry.

With reference to the second aspect of the embodiments of the present invention to the fifth implementation manner of the second aspect of the embodiments of the present invention, in a seventh implementation manner of the second aspect of the embodiments of the present invention, if the control plane gateway determines that a paging parameter of the terminal changes, the control plane gateway modifies an IP processing entry that is corresponding to the terminal whose paging parameter has changed, and updates a first paging message buffered in the IP processing entry.

A third aspect of embodiments of the present invention provides a forwarding plane gateway device, including:

a first receiving unit, configured to receive a downlink packet; and a first sending unit, configured to send a second paging message to at least one base station according to the downlink packet, where the second paging message is used for paging a terminal.

With reference to the third aspect of the embodiments of the present invention, in a first implementation manner of the third aspect of the embodiments of the present invention, the device further includes:

a second receiving unit, configured to receive a first paging message sent by a control plane gateway; and the first sending unit is further configured to: determine a destination address of the second paging message according to a destination address of the downlink packet, and send the second paging message to the at least one base station according to the destination address of the second paging message.

With reference to the first implementation manner of the third aspect of the embodiments of the present invention, in a second implementation manner of the third aspect of the embodiments of the present invention, the device further includes:

a third receiving unit, configured to receive a group entry and an IP processing entry that are sent by the control plane gateway; and the first sending unit includes:

a determining module, configured to: determine, according to the destination address of the downlink packet, a group entry that is in the IP processing entry and corresponding to the destination address of the downlink packet, and execute an action entry of the group entry, where the action entry includes the destination address of the second paging message;

a change module, configured to change the first paging message to the second paging message according to the action entry corresponding to the group entry; and a sending module, configured to send the second paging message to the at least one base station.

With reference to the second implementation manner of the third aspect of the embodiments of the present invention, in a third implementation manner of the third aspect of the embodiments of the present invention, the change module is further configured to change a destination address of the first paging message to the destination address, included in the action entry, of the second paging message, where the second paging message is the first paging message whose destination address has been changed according to the action entry.

With reference to the third aspect of the embodiments of the present invention to the third implementation manner of the third aspect of the embodiments of the present invention, in a fourth implementation manner of the third aspect of the embodiments of the present invention, the device further includes:

a storage unit, configured to buffer the downlink packet.

With reference to the third aspect of the embodiments of the present invention to the fourth implementation manner of the third aspect of the embodiments of the present invention, in a fifth implementation manner of the third aspect of the embodiments of the present invention, the device further includes:

a second sending unit, configured to report a paging timeout event to the control plane gateway when an instruction sent by the control plane gateway for setting the IP processing entry is not received within a preset time, so that the control plane gateway sends, to the forwarding plane gateway, an instruction for deleting the IP processing entry of the terminal, where the instruction for setting the IP processing entry is correspondingly generated by the control plane gateway according to a paging response message sent by the terminal, and the paging response message is correspondingly generated by the terminal according to the second paging message; and a fourth receiving unit, configured to: receive the instruction sent by the control plane gateway for deleting the IP processing entry of the terminal, delete the IP processing entry of the terminal according to the instruction for deleting the IP processing entry of the terminal, and release the downlink packet.

A fourth aspect of embodiments of the present invention provides a control plane gateway device, including:

a third sending unit, configured to send a group entry and an IP processing entry to a forwarding plane gateway, where the group entry is corresponding to the IP processing entry; and a fourth sending unit, configured to send a first paging message to the forwarding plane gateway, so that the forwarding plane gateway changes the first paging message to a second paging message according to the group entry and the IP processing entry, where the second paging message is used for paging a terminal.

With reference to the fourth aspect of the embodiments of the present invention, in a first implementation manner of the fourth aspect of the embodiments of the present invention, the device further includes:

a fifth sending unit, configured to send, to the forwarding plane gateway, an instruction for setting the IP processing entry, so that the forwarding plane gateway sets the action entry to outer tunnel encapsulation according to the instruction for setting the IP processing entry and associates the IP processing entry with an address of a terminal that receives the downlink packet.

With reference to the fourth aspect of the embodiments of the present invention, in a second implementation manner of the fourth aspect of the embodiments of the present invention, the device further includes:

a fifth receiving unit, configured to: if a paging timeout event sent by the forwarding plane gateway is received, send, to the forwarding plane gateway, an instruction for deleting the IP processing entry, so that the forwarding plane gateway deletes the IP processing entry, where the paging timeout event is generated when the forwarding plane gateway does not receive, within a preset time, an instruction for setting the IP processing entry, and the instruction for setting the IP processing entry is used to instruct the forwarding plane gateway to set the action entry to outer tunnel encapsulation and associate the IP processing entry with an address of a terminal that receives the downlink packet.

With reference to the fourth aspect of the embodiments of the present invention to the second implementation manner of the fourth aspect of the embodiments of the present invention, in a third implementation manner of the fourth aspect of the embodiments of the present invention, the device further includes:

a first modification unit, configured to: if it is determined that the terminal moves from a current location area to an updated location area, modify an IP processing entry that is corresponding to the terminal located in the updated location area, so that the terminal located in the updated location area can be paged by using a group entry that is corresponding to the modified IP processing entry.

With reference to the fourth aspect of the embodiments of the present invention to the second implementation manner of the fourth aspect of the embodiments of the present invention, in a fourth implementation manner of the fourth aspect of the embodiments of the present invention, the device further includes:

a second modification unit, configured to: if it is determined that a paging parameter of the terminal changes, modify an IP processing entry that is corresponding to the terminal whose paging parameter has changed, and update a first paging message buffered in the IP processing entry.

A fifth aspect of embodiments of the present invention provides a system, where the system includes a base station located in each location area and a terminal that is located in the location area and connected to the base station, and the system further includes:

the forwarding plane gateway device according to any one of the third aspect of the embodiments of the present invention to the fifth implementation manner of the third aspect of the embodiments of the present invention; and the control plane gateway device according to any one of the fourth aspect of the embodiments of the present invention to the fourth implementation manner of the fourth aspect of the embodiments of the present invention, where the forwarding plane gateway device is connected to the control plane gateway device, the forwarding plane gateway device is separately connected to the base station and the terminal, and the control plane gateway device is separately connected to the base station and the terminal.

A sixth aspect of embodiments of the present invention provides a forwarding plane gateway device, including:

a memory, a central processing unit, a peripheral interface, an RF circuit, a power management chip, and a communications bus, where the central processing unit performs the following operations:

receiving a downlink packet; and sending a second paging message to at least one base station according to the downlink packet, where the second paging message is used for paging a terminal.

With reference to the sixth aspect of the embodiments of the present invention, in a first implementation manner of the sixth aspect of the embodiments of the present invention, the central processing unit specifically performs the following operations:

receiving a first paging message sent by a control plane gateway; and determining a destination address of the second paging message according to a destination address of the downlink packet, and sending the second paging message to the at least one base station according to the destination address of the second paging message.

With reference to the first implementation manner of the sixth aspect of the embodiments of the present invention, in a second implementation manner of the sixth aspect of the embodiments of the present invention, the central processing unit specifically performs the following operations:

receiving a group entry and an IP processing entry that are sent by the control plane gateway;

determining, according to the destination address of the downlink packet, a group entry that is in the IP processing entry and corresponding to the destination address of the downlink packet, and executing an action entry of the group entry, where the action entry includes the destination address of the second paging message;

changing the first paging message to the second paging message according to the action entry corresponding to the group entry; and sending the second paging message to the at least one base station.

With reference to the second implementation manner of the sixth aspect of the embodiments of the present invention, in a third implementation manner of the sixth aspect of the embodiments of the present invention, the central processing unit specifically performs the following operation:

changing a destination address of the first paging message to the destination address, included in the action entry, of the second paging message, where the second paging message is the first paging message whose destination address has been changed according to the action entry.

With reference to the sixth aspect of the embodiments of the present invention to the third implementation manner of the sixth aspect of the embodiments of the present invention, in a fourth implementation manner of the sixth aspect of the embodiments of the present invention, the central processing unit specifically performs the following operation:

buffering the downlink packet.

With reference to the sixth aspect of the embodiments of the present invention to the fourth implementation manner of the sixth aspect of the embodiments of the present invention, in a fifth implementation manner of the sixth aspect of the embodiments of the present invention, the central processing unit specifically performs the following operations:

reporting a paging timeout event to the control plane gateway when an instruction sent by the control plane gateway for setting the IP processing entry is not received within a preset time, so that the control plane gateway sends, to the forwarding plane gateway, an instruction for deleting the IP processing entry of the terminal, where the instruction for setting the IP processing entry is correspondingly generated by the control plane gateway according to a paging response message sent by the terminal, and the paging response message is correspondingly generated by the terminal according to the second paging message; and receiving the instruction sent by the control plane gateway for deleting the IP processing entry of the terminal, deleting the IP processing entry of the terminal according to the instruction for deleting the IP processing entry of the terminal, and releasing the downlink packet.

A seventh aspect of embodiments of the present invention provides a control plane gateway device, including:

a memory, a central processing unit, a peripheral interface, an RF circuit, a power management chip, and a communications bus, where the central processing unit performs the following operations:

sending a group entry and an IP processing entry to a forwarding plane gateway, where the group entry is corresponding to the IP processing entry; and sending a first paging message to the forwarding plane gateway, so that the forwarding plane gateway changes the first paging message to a second paging message according to the group entry and the IP processing entry, where the second paging message is used for paging a terminal.

With reference to the seventh aspect of the embodiments of the present invention, in a first implementation manner of the seventh aspect of the embodiments of the present invention, the central processing unit specifically performs the following operation:

sending, to the forwarding plane gateway, an instruction for setting the IP processing entry, so that the forwarding plane gateway sets the action entry to outer tunnel encapsulation according to the instruction for setting the IP processing entry and associates the IP processing entry with an address of a terminal that receives the downlink packet.

With reference to the seventh aspect of the embodiments of the present invention, in a second implementation manner of the seventh aspect of the embodiments of the present invention, the central processing unit specifically performs the following operation:

if a paging timeout event sent by the forwarding plane gateway is received, sending, to the forwarding plane gateway, an instruction for deleting the IP processing entry, so that the forwarding plane gateway deletes the IP processing entry, where the paging timeout event is generated when the forwarding plane gateway does not receive, within a preset time, an instruction for setting the IP processing entry, and the instruction for setting the IP processing entry is used to instruct the forwarding plane gateway to set the action entry to outer tunnel encapsulation and associate the IP processing entry with an address of a terminal that receives the downlink packet.

With reference to the control plane gateway device according to any one of the seventh aspect of the embodiments of the present invention to the second implementation manner of the seventh aspect of the embodiments of the present invention, in a third implementation manner of the seventh aspect of the embodiments of the present invention, the central processing unit specifically performs the following operation:

if it is determined that the terminal moves from a current location area to an updated location area, modifying an IP processing entry that is corresponding to the terminal located in the updated location area, so that the terminal located in the updated location area can be paged by using a group entry that is corresponding to the modified IP processing entry.

With reference to the control plane gateway device according to any one of the seventh aspect of the embodiments of the present invention to the second implementation manner of the seventh aspect of the embodiments of the present invention, the central processing unit specifically performs the following operations:

if it is determined that a paging parameter of the terminal changes, modifying an IP processing entry that is corresponding to the terminal whose paging parameter has changed, and updating a first paging message buffered in the IP processing entry.

In the paging method in the present invention, a forwarding plane gateway sends a second paging message to at least one base station according to a downlink packet. The second paging message is used for paging a terminal. Therefore, a control plane gateway is not required to page UE, so that signaling interworking between the control plane gateway and the forwarding plane gateway is reduced, and a paging delay is shortened.

DETAILED DESCRIPTION

The following describes in detail a paging method, a related device, and a system according to embodiments of the present invention. The paging method is applied to a network system that includes a control plane gateway, a forwarding plane gateway, a base station, and user equipment UE. The control plane gateway is separated from the forwarding plane gateway.

Figure 1:
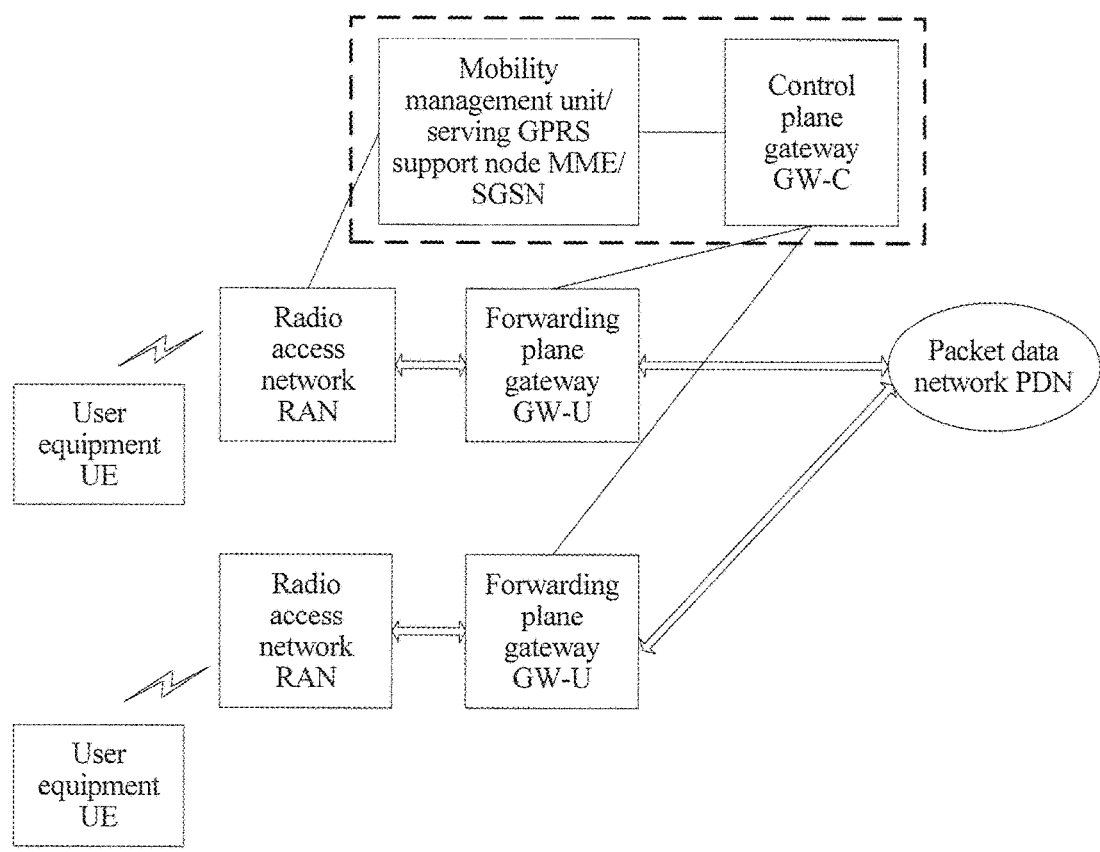
FIG. 1 is a schematic structural diagram of an existing evolved network system.
Figure 2:
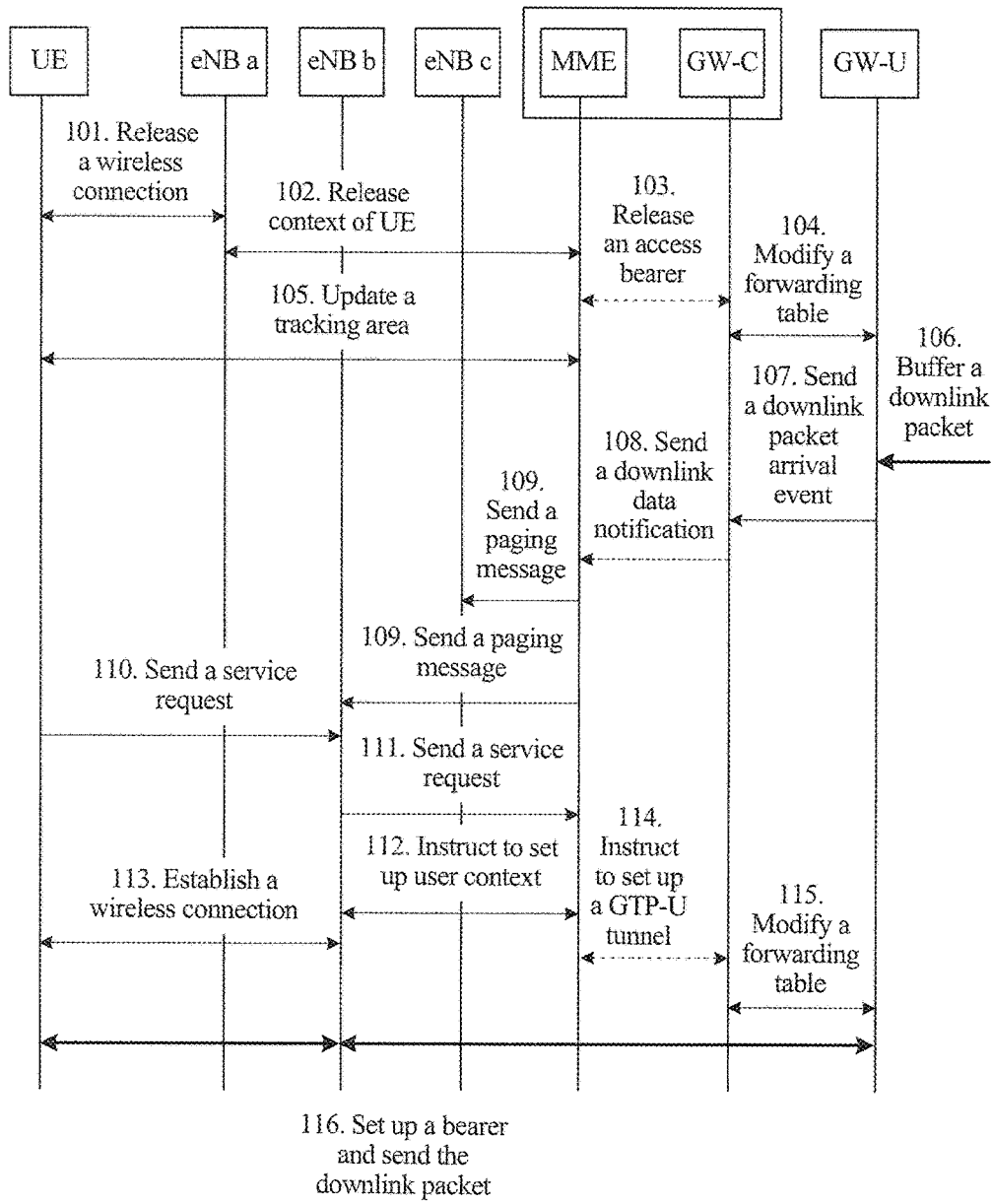
FIG. 2 is a schematic flowchart of an existing paging method.
Figure 3:
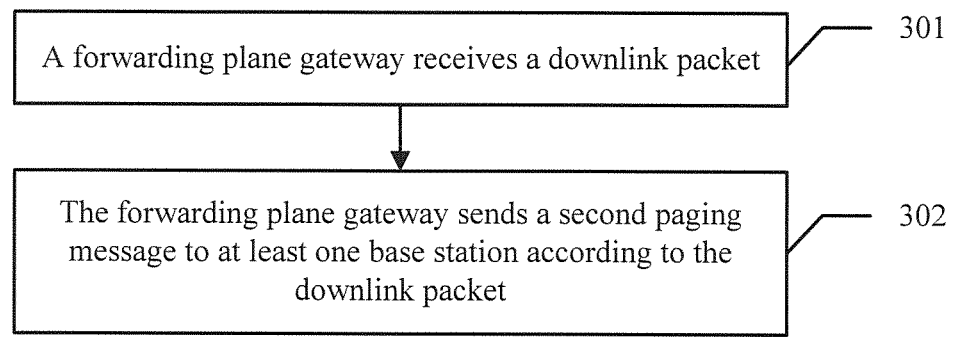
FIG. 3 is a step flowchart of an example of embodiments of a paging method according to an embodiment of the present invention.

As shown in FIG. 3, a paging method includes the following steps.

301. A forwarding plane gateway receives a downlink packet.

The forwarding plane gateway receives the downlink packet sent by a network side.

302. The forwarding plane gateway sends a second paging message to at least one base station according to the downlink packet.

The forwarding plane gateway determines the second paging message according to the received downlink packet. How the forwarding plane gateway specifically determines the second paging message is not limited in this embodiment provided that the second paging message can page a terminal.

In the method according to this embodiment, a second paging message is determined by using a user packet received by a forwarding plane gateway, so that the forwarding plane gateway pages a terminal by using the second paging message, and a control plane gateway is not required to page the terminal. Therefore, a paging time is reduced.

Figure 4A:
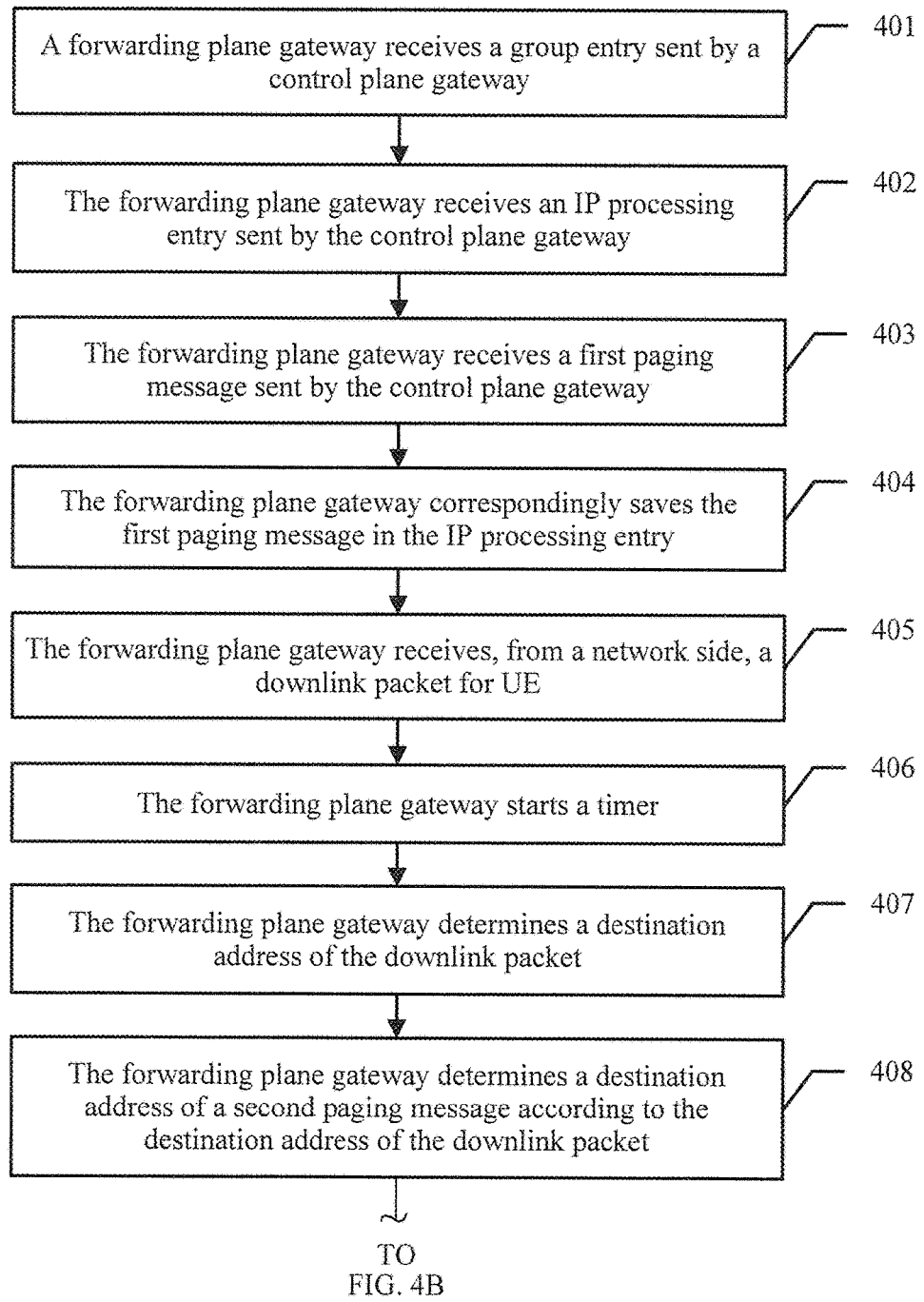
FIG. 4A and FIG. 4B are a step flowchart of another example of embodiments of a paging method according to an embodiment of the present invention.
Figure 4B:
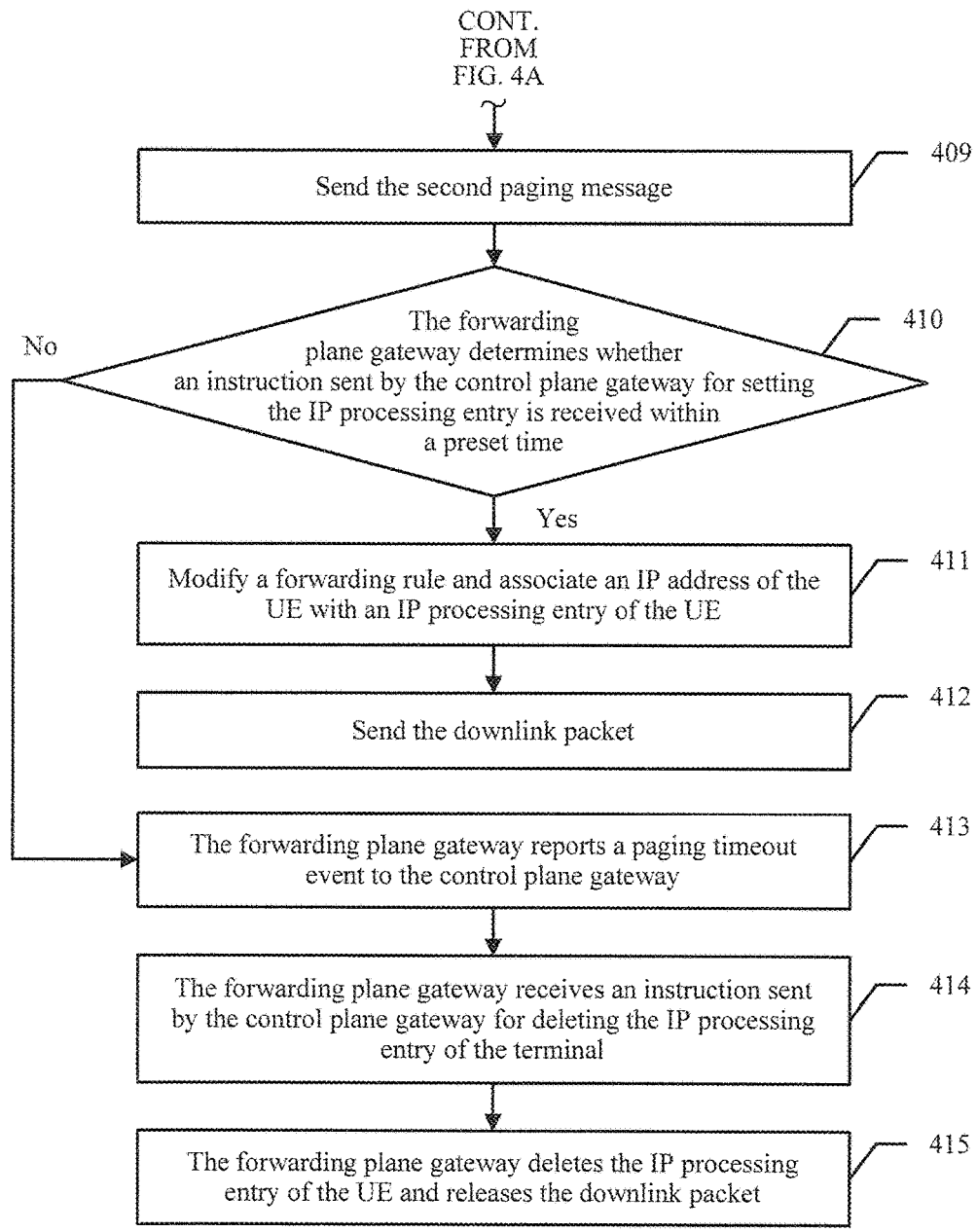

With reference to FIG. 4A and FIG. 4B, the following describes in detail how the forwarding plane gateway specifically determines the second paging message.

401. A forwarding plane gateway receives a group entry sent by a control plane gateway.

The control plane gateway configures the group entry for each location area, so that the group entry is corresponding to each location area.

The group entry may be in one-to-one correspondence with the location area, or one location area may be corresponding to multiple group entries, or one group entry is corresponding to multiple location areas. A specific corresponding manner is not limited in this embodiment.

It should be noted that base station information corresponding to the terminal is an address of a base station in one or more location areas, and the one or more location areas include a current location area of the terminal.

In this embodiment, each group entry is corresponding to one location area, and each group entry is corresponding to one group entry identifier.

The group entry identifier is not limited in this embodiment. For example, the group entry identifier may be a tracking area identity (TAI) or a routing area identity (RAI). In an example of this embodiment, the group entry identifier is a tracking area identity (TAI).

As shown in Table 1, Table 1 shows a format of a group entry. It may be learned from Table 1 that a mobile network includes two TAIs. A location area represented by a TAI 1 includes a base station a and a base station b, and a location area represented by a TAI 2 includes a base station c, a base station d, and a base station e.

TABLE 1

| Group entry identifier | Action entry set |
|---|---|
| 1 | Two action entries (a and b) are included |
| 2 | Three action entries (c, d, and e) are included |

The group entry identifier is used to index a group entry. The action entry set includes an operation performed on a paging message that is used for paging a terminal. Actions included in an action entry for the base station a may be: setting a destination MAC address of a first paging message to a MAC address of the base station a, setting a source MAC address of the first paging message to a MAC address of a forwarding plane gateway device, setting a destination IP address of the first paging message to an IP address of the base station a, setting a source IP address of the first paging message to an IP address of the forwarding plane gateway device, and outputting the first paging message from a port 1 (It is assumed that the base station a is connected to the forwarding plane gateway by using the port 1). Similarly, actions included in an action entry for another base station X may be: setting a destination MAC address of a first paging message to a MAC address of the base station X, setting a source MAC address of the first paging message to a MAC address of a forwarding plane gateway device, setting a destination IP address of the first paging message to an IP address of the base station X, setting a source IP address of the first paging message to an IP address of the forwarding plane gateway device, and outputting the first paging message from a port Y (It is assumed that the base station X is connected to the forwarding plane gateway by using the port Y).

It should be pointed out that the action entry herein is not unique. If the paging message is only encapsulated but not forwarded, it is only required to set a destination IP address of the first paging message to an IP address of a base station, so as to meet a requirement. Information such as a MAC address of a peer end and an output port may be subsequently determined according to the destination IP address by using another forwarding table. In addition, the action entry may also include modification actions for other L2 and L3 header fields, for example, adding a VLAN identifier or adding an MPLS label, and is not limited to modifying only a MAC address and an IP address.

402. The forwarding plane gateway receives an IP processing entry sent by the control plane gateway.

In this embodiment, after UE enters an idle state, the base station sends a user context release message to the control plane gateway to instruct the UE to enter a control state. In this case, the control plane gateway determines a current location area of the UE. The location area includes a tracking location area or a routing location area. In this embodiment, the control plane gateway determines that the UE is located in the location area represented by the TAI 1.

The control plane gateway correspondingly reconfigures the IP processing entry according to the location area of the UE.

The IP processing entry before the control plane gateway modifies the IP processing entry is shown in Table 2.

TABLE 2

| Match entry | Action | Content storage entry |
|---|---|---|
| Destination IP | Outer tunnel encapsulation | Empty |

The IP processing entry after the control plane gateway modifies the IP processing entry is shown in Table 3.

TABLE 3

| Match entry | Group entry identifier | Content storage entry |
|---|---|---|
| Destination IP | 1 | First paging message |

In this embodiment, the match entry in the IP processing entry may be an IP address of the UE.

When modifying the IP processing entry, the control plane gateway deletes an operation of encapsulating a downlink tunnel of the IP address and associates an IP processing entry for the UE with a group entry for the UE.

In this embodiment, an association relationship between the IP processing entry and the group entry is established by using the group entry identifier. That is, the IP processing entry includes a group entry identifier that is corresponding to the location area of the UE.

In this embodiment, because the control plane gateway determines that the UE is located in a location area corresponding to a group entry identifier 1, the control plane gateway adds the group entry identifier 1 to the IP processing entry when modifying the IP processing entry.

In this embodiment, the first paging message is a paging message that is delivered by the control plane gateway to the UE. In this embodiment, a specific quantity of the first paging message is not limited. That is, the forwarding plane gateway may simultaneously page at least one terminal.

403. The forwarding plane gateway receives a first paging message sent by the control plane gateway.

The first paging message received by the forwarding plane gateway may include information such as a paging identifier (such as an S-TMSI) for the UE and a paging index required by the base station for paging.

Optionally, the paging message may include some information of an L2 or L3 header, for example, a source MAC address or a source IP address. The information is identical for all base stations in the location area.

404. The forwarding plane gateway correspondingly saves the first paging message in the IP processing entry.

After receiving the first paging message, the forwarding plane gateway may save the first paging message in the content storage entry in the IP processing entry shown in Table 3.

405. The forwarding plane gateway receives, from a network side, a downlink packet for UE.

The forwarding plane gateway may buffer the downlink packet after receiving the downlink packet.

406. The forwarding plane gateway starts a timer.

The forwarding plane gateway starts the timer and starts timing.

407. The forwarding plane gateway determines a destination address of the downlink packet.

408. The forwarding plane gateway determines a destination address of the second paging message according to the destination address of the downlink packet.

The following illustrates a specific process in which the forwarding plane gateway determines the destination address of the second paging message.

4081. The forwarding plane gateway matches the IP processing entry according to the destination address of the downlink packet by using a match entry.

Specifically, if the forwarding plane gateway determines that the destination address of the downlink packet is the same as a destination IP address in the match entry in the IP processing entry, the forwarding plane gateway can match the IP processing entry.

4082. The forwarding plane gateway determines a corresponding group entry according to the matched IP processing entry.

In this embodiment, the forwarding plane gateway may determine, according to the IP processing entry shown in Table 3, that a group entry identifier of the corresponding group entry is 1.

4083. The forwarding plane gateway outputs the first paging message to a group entry of a location area corresponding to the UE.

In this embodiment, the forwarding plane gateway outputs the first paging message to the group entry whose group entry identifier is 1.

4084. The forwarding plane gateway executes an action entry corresponding to the group entry.

In this embodiment, the forwarding plane gateway executes an action entry corresponding to a group entry 1, as shown in Table 1.

After outputting the first paging message to the group entry of the location area corresponding to the UE and obtaining an address of a base station in the location area corresponding to the UE, the forwarding plane gateway sets, according to the group entry of the location area corresponding to the UE, the destination address of the first paging message outputted to the group entry to the address of the base station in the location area corresponding to the UE, so as to form the second paging message.

Changing the first paging message outputted to the group entry to the second paging message according to the action entry is changing the destination address of the first paging message to the destination address, included in the action entry, of the second paging message.

Specifically, a destination IP address of the first paging message outputted to the group entry is set to an IP address of the base station in the location area corresponding to the UE, and a source IP address of the first paging message outputted to the group entry is set to an IP address of the forwarding plane gateway; a destination MAC address of the first paging message outputted to the group entry is set to a MAC address of the base station in the location area corresponding to the UE, and a source MAC address of the first paging message outputted to the group entry is set to a MAC address of the forwarding plane gateway; and an output port is selected for the first paging message outputted to the group entry, and the output port is a port for connecting the forwarding plane gateway and the base station in the location area corresponding to the UE.

That is, the second paging message is the first paging message whose destination address has been changed according to the action entry.

409. Send the second paging message.

Specifically, after the forwarding plane gateway sets, according to the group entry of the location area corresponding to the UE, the destination address of the first paging message outputted to the group entry to the address of the base station in the location area corresponding to the UE, the forwarding plane gateway sends the second paging message to the base station in the location area according to the address of the base station in the location area corresponding to the UE.

The group entry shown in Table 1 in this embodiment is used as an example. The location area corresponding to the UE is corresponding to the group entry 1, and the first paging message is sent to the corresponding group entry 1. The destination MAC and the destination IP of the first paging message are separately set to addresses of the base station a and to addresses of the base station b according to the two action sets in the group entry 1, and the paging message is sent from a port for connecting the forwarding plane gateway to the base station a and the base station b. The forwarding plane gateway sends the second paging message to the base station a and the base station b each. The second paging messages have a same paging message body, but the destination MAC and the destination IP of the second paging message sent to the base station a are the addresses of the base station a, and the destination MAC and the destination IP of the second paging message sent to the base station b are the addresses of the base station b. After receiving the second paging message, the base station a and the base station b page the UE according to information such as a user identifier and a paging index in the second paging message.

After receiving the second paging message from the base station a and the base station b, the UE responds to the second paging message, sends a service request to the control plane gateway by using the base station a and the base station b, and re-enters an activated state.

After sending the second paging message to the base station in the location area, the UE sends a service request to the control plane gateway by using the base station.

410. The forwarding plane gateway determines whether an instruction sent by the control plane gateway for setting the IP processing entry is received within a preset time, and if yes, performs step 411, or if no, performs step 413.

411. Update an action entry in the IP processing entry.

Specifically, the control plane gateway sends, to the forwarding plane gateway according to the service request, the instruction for setting the IP processing entry. The instruction for setting the IP processing entry is used for setting the action entry in the IP processing entry of the UE to outer tunnel encapsulation.

The forwarding plane gateway receives the instruction for setting the IP processing entry, and sets, according to the instruction for setting the IP processing entry, the action entry in the IP processing entry of the UE to outer tunnel encapsulation.

412. Send the downlink packet.

Specifically, after setting the action entry in the IP processing entry of the UE to outer tunnel encapsulation, the forwarding plane gateway encapsulates the downlink packet according to the IP processing entry of the UE, and sends the buffered downlink packet to the UE by using the base station in the location area.

Briefly, when the control plane gateway receives the service request sent by the UE by using the base station, the control plane gateway updates the IP processing entry of the UE that is in the forwarding plane gateway, so that the forwarding plane gateway re-generates a downlink tunnel encapsulation action for the IP processing entry of the UE. In this process, the first paging message stored in the IP processing entry of the UE may be deleted.

413. The forwarding plane gateway reports a paging timeout event to the control plane gateway.

The forwarding plane gateway reports the paging timeout event to the control plane gateway, so that the control plane gateway sends, to the forwarding plane gateway, an instruction for deleting the IP processing entry of the UE.

414. The forwarding plane gateway receives an instruction sent by the control plane gateway for deleting the IP processing entry of the terminal.

415. The forwarding plane gateway deletes the IP processing entry of the UE and releases the downlink packet.

It may be learned from this embodiment that, after UE enters an idle state, a downlink packet directly triggers a forwarding plane gateway to send a second paging message to a base station, and the forwarding plane gateway does not need to instruct a control plane gateway to trigger a paging message. Therefore, signaling interworking between the control plane gateway and the forwarding plane gateway is reduced, and a paging delay is shortened.

In this embodiment, an IP processing entry may be associated with multiple group entries. If an IP processing entry cannot be associated with multiple group entries, the IP processing entry may be first associated with a converged group entry. The converged group entry is corresponding to multiple group entries. The following specifically describes such a case.

Figure 5A:
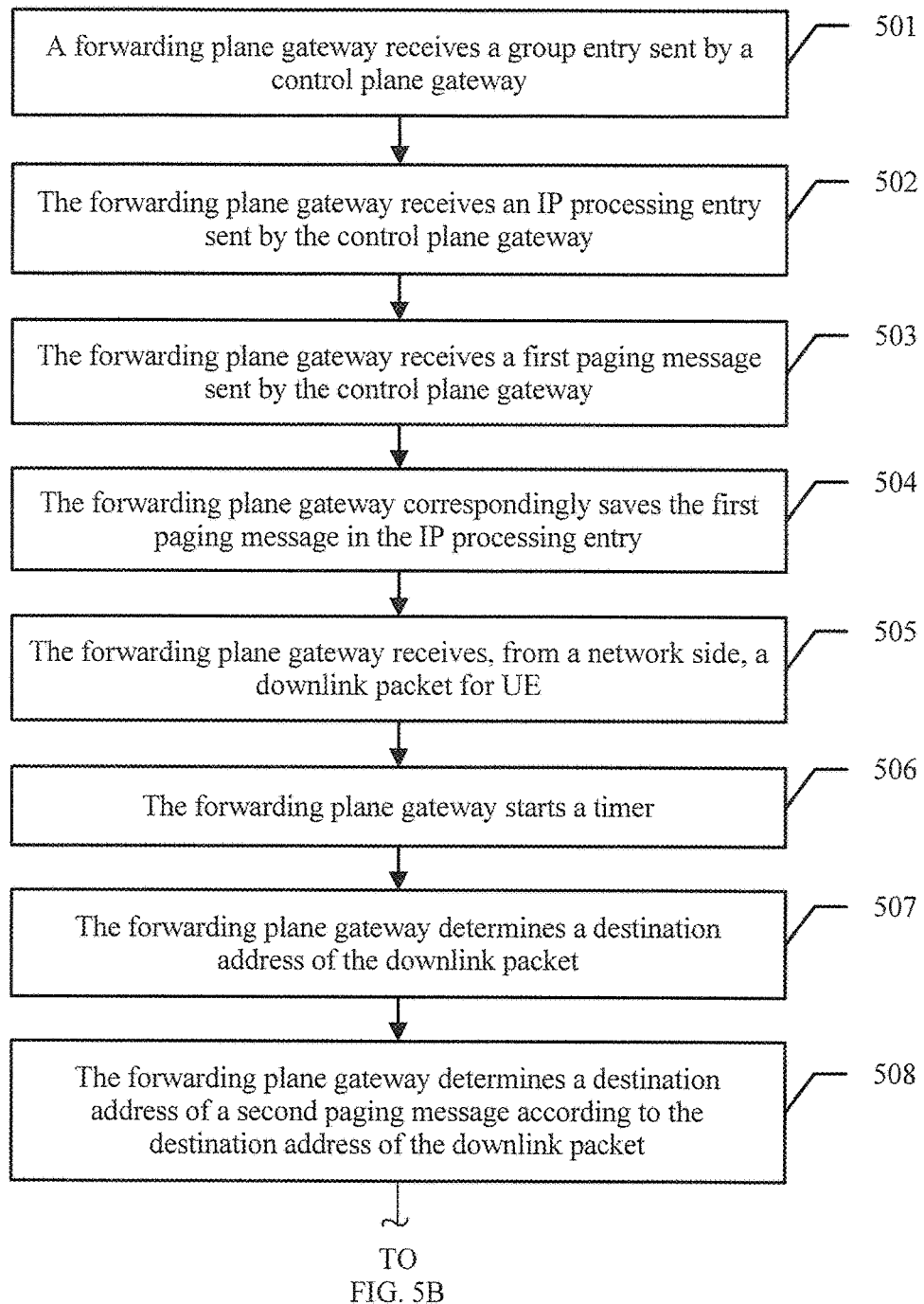
FIG. 5A and FIG. 5B are a step flowchart of another example of embodiments of a paging method according to an embodiment of the present invention.
Figure 5B:
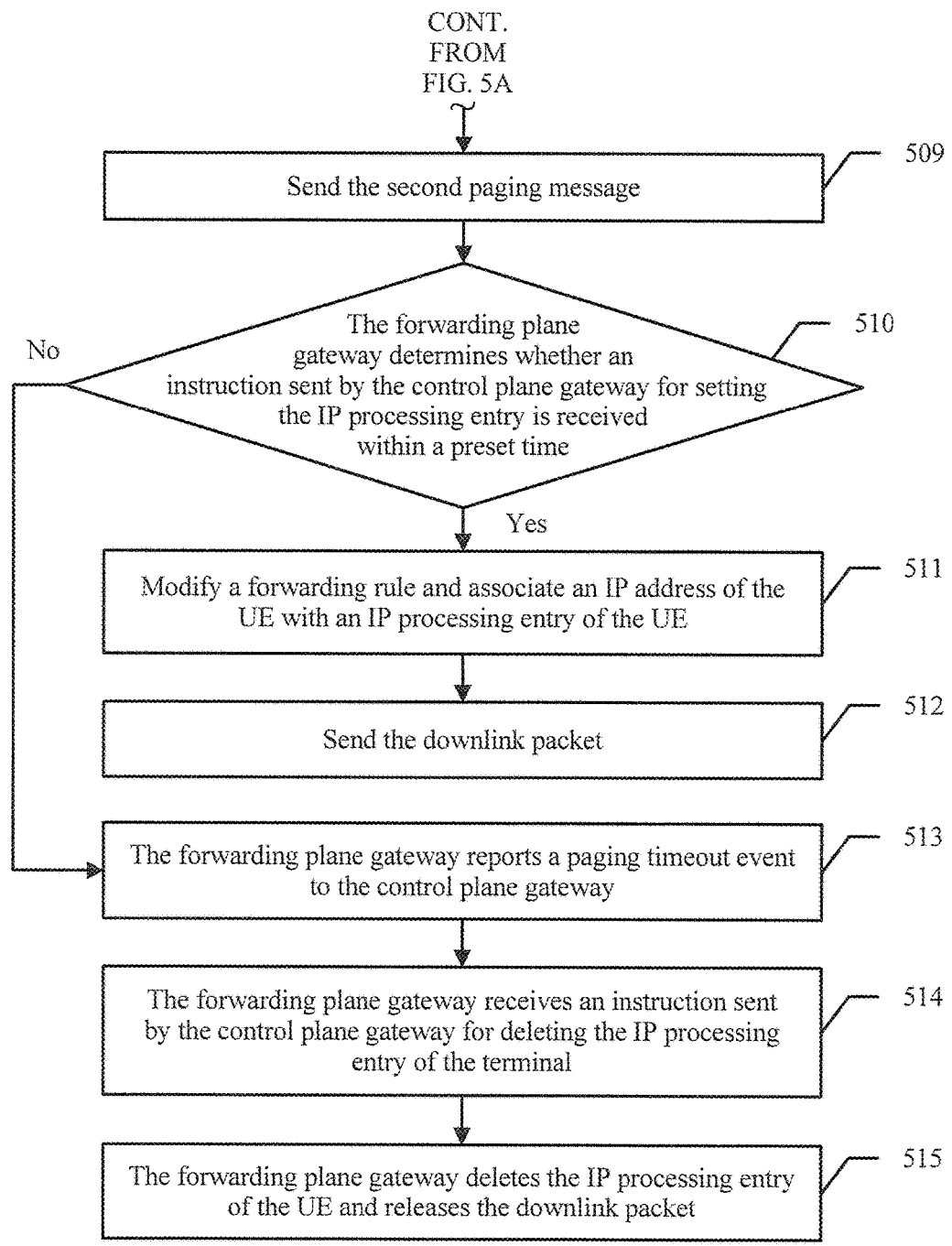

According to the embodiment shown in FIG. 4A and FIG. 4B, the group entry that is of the location area corresponding to the UE and that is associated with the IP processing entry of the UE may be one group entry corresponding to an included action set. In the following descriptions with reference to an embodiment shown in FIG. 5A and FIG. 5B, the group entry that is of the location area corresponding to the UE and that is associated with the IP processing entry of the UE may be multiple group entries corresponding to an included action set.

501. A forwarding plane gateway receives a group entry sent by a control plane gateway.

The control plane gateway configures the group entry for each location area, so that the group entry is corresponding to each location area.

The group entry may be in one-to-one correspondence with the location area, or one location area may be corresponding to multiple group entries, or one group entry is corresponding to multiple location areas. A specific corresponding manner is not limited in this embodiment.

It should be noted that base station information corresponding to the terminal is an address of a base station in one or more location areas, and the one or more location areas include a current location area of the terminal.

In this embodiment, each group entry is corresponding to one location area, and each group entry is corresponding to one group entry identifier.

The group entry identifier is not limited in this embodiment. For example, the group entry identifier may be a tracking area identity (TAI) or a routing area identity (RAI). In an example of this embodiment, the group entry identifier is a tracking area identity (TAI).

In this embodiment, the group entry received by the forwarding plane gateway may be shown in Table 4.

TABLE 4

| Group entry identifier | Action entry set |
| --- | --- |
| 1 | Two action entries (a and b) are included |
| 2 | Three action entries (c, d, and e) are included |
| 3 | Two action entries are included, separately corresponding to a group entry 1 and a group entry 2 |

An action entry set in a group entry 3 includes two action entries. The two action entries are separately corresponding to the group entry 1 and the group entry 2.

The group entry identifier is used to index a group entry. The action entry set includes an operation performed on a paging message that is used for paging a terminal. Actions included in an action entry for the base station a may be: setting a destination MAC address of a first paging message to a MAC address of the base station a, setting a source MAC address of the first paging message to a MAC address of a forwarding plane gateway device, setting a destination IP address of the first paging message to an IP address of the base station a, setting a source IP address of the first paging message to an IP address of the forwarding plane gateway device, and outputting the first paging message from a port 1 (It is assumed that the base station a is connected to the forwarding plane gateway by using the port 1). Similarly, actions included in an action entry for another base station X may be: setting a destination MAC address of a first paging message to a MAC address of the base station X, setting a source MAC address of the first paging message to a MAC address of a forwarding plane gateway device, setting a destination IP address of the first paging message to an IP address of the base station X, setting a source IP address of the first paging message to an IP address of the forwarding plane gateway device, and outputting the first paging message from a port Y (It is assumed that the base station X is connected to the forwarding plane gateway by using the port Y).

It should be pointed out that the action entry herein is not unique. If the paging message is only encapsulated but not forwarded, it is only required to set a destination IP address of the first paging message to an IP address of a base station, so as to meet a requirement. Information such as a MAC address of a peer end and an output port may be subsequently determined according to the destination IP address by using another forwarding table. In addition, the action entry may also include modification actions for other L2 and L3 header fields, for example, adding a VLAN identifier or adding an MPLS label, and is not limited to modifying only a MAC address and an IP address.

502. The forwarding plane gateway receives the IP processing entry sent by the control plane gateway.

In this embodiment, after UE enters an idle state, the base station sends a user context release message to the control plane gateway to instruct the UE to enter a control state. In this case, the control plane gateway determines a current location area of the UE. The location area includes a tracking location area or a routing location area. In this embodiment, the control plane gateway determines that the UE is located in a location area represented by a group entry identifier 3. In this embodiment, the group entry corresponding to the group entry identifier 3 is a converged group entry. That is, the converged group entry is corresponding to multiple tracking location areas.

The IP processing entry after the control plane gateway modifies the IP processing entry is shown in Table 5.

TABLE 5

| Match entry | Group entry identifier | Content storage entry |
|---|---|---|
| Destination IP | 3 | First paging message |

In this embodiment, the match entry in the IP processing entry may be an IP address of the UE.

That is, the control plane gateway deletes an operation of encapsulating a downlink tunnel of the IP address and associates an IP processing entry for the UE with a group entry for the UE.

In this embodiment, because the control plane gateway determines that the UE is located in the location area corresponding to the group entry identifier 3, the control plane gateway adds the group entry identifier 3 to the IP processing entry when modifying the IP processing entry.

In this embodiment, an association relationship between the IP processing entry and the group entry is established by using the group entry identifier. That is, the IP processing entry includes a group entry identifier that is corresponding to the location area of the UE. In an example of this embodiment, the group entry identifier is 3.

In this embodiment, the first paging message is a paging message that is delivered by the control plane gateway to the UE. In this embodiment, a specific quantity of the first paging message is not limited. That is, the forwarding plane gateway may simultaneously page at least one terminal.

503. The forwarding plane gateway receives a first paging message sent by the control plane gateway.

The first paging message received by the forwarding plane gateway may include information such as a paging identifier (such as an S-TMSI) for the UE and a paging index required by the base station for paging.

Optionally, the paging message may include some information of an L2 or L3 header, for example, a source MAC address or a source IP address. The information is identical for all base stations in the location area.

504. The forwarding plane gateway correspondingly saves the first paging message in the IP processing entry.

After receiving the first paging message, the forwarding plane gateway may save the first paging message in the content storage entry in the IP processing entry shown in Table 5.

505. The forwarding plane gateway receives, from a network side, a downlink packet for UE.

The forwarding plane gateway may buffer the downlink packet after receiving the downlink packet.

506. The forwarding plane gateway starts a timer.

The forwarding plane gateway starts the timer and starts timing.

507. The forwarding plane gateway determines a destination address of the downlink packet.

508. The forwarding plane gateway determines a destination address of the second paging message according to the destination address of the downlink packet.

The following illustrates a specific process in which the forwarding plane gateway determines the destination address of the second paging message.

5081. The forwarding plane gateway matches the IP processing entry according to the destination address of the downlink packet by using the match entry.

Specifically, if the forwarding plane gateway determines that the destination address of the downlink packet is the same as a destination IP address in the match entry in the IP processing entry, the forwarding plane gateway can match the corresponding IP processing entry.

5082. The forwarding plane gateway determines a corresponding group entry according to the matched IP processing entry.

In this embodiment, the forwarding plane gateway may determine, according to the IP processing entry shown in Table 5, that a group entry identifier of the corresponding group entry is 3.

5083. The forwarding plane gateway outputs the first paging message to a group entry of a location area corresponding to the UE.

In this embodiment, the forwarding plane gateway outputs the first paging message to the group entry whose group entry identifier is 3.

5084. The forwarding plane gateway executes an action entry corresponding to the group entry.

In this embodiment, the forwarding plane gateway executes an action entry corresponding to a group entry 3, as shown in Table 4.

After outputting the first paging message to the group entry of the location area corresponding to the UE and obtaining an address of a base station in the location area corresponding to the UE, the forwarding plane gateway sets, according to the group entry of the location area corresponding to the UE, the destination address of the first paging message outputted to the group entry to the address of the base station in the location area corresponding to the UE, so as to form the second paging message.

Changing the first paging message outputted to the group entry to the second paging message according to the action entry is changing the destination address of the first paging message to the destination address, included in the action entry, of the second paging message.

Specifically, a destination IP address of the first paging message outputted to the group entry is set to an IP address of the base station in the location area corresponding to the UE, and a source IP address of the first paging message outputted to the group entry is set to an IP address of the forwarding plane gateway; a destination MAC address of the first paging message outputted to the group entry is set to a MAC address of the base station in the location area corresponding to the UE, and a source MAC address of the first paging message outputted to the group entry is set to a MAC address of the forwarding plane gateway; and an output port is selected for the first paging message outputted to the group entry, and the output port is a port for connecting the forwarding plane gateway and the base station in the location area corresponding to the UE.

That is, the second paging message is the first paging message whose destination address has been changed according to the action entry.

509. Send the second paging message.

Specifically, after the forwarding plane gateway sets, according to the group entry of the location area corresponding to the UE, the destination address of the first paging message outputted to the group entry to the address of the base station in the location area corresponding to the UE, the forwarding plane gateway sends the second paging message to the base station in the location area according to the address of the base station in the location area corresponding to the UE.

The group entry shown in Table 4 in this embodiment is used as an example. The location area corresponding to the UE is corresponding to the group entry 3, and the first paging message is sent to the corresponding group entry 1 and group entry 2. The destination MAC and the destination IP of the first paging message are separately set to addresses of the base station a and to addresses of the base station b according to the two action sets in the group entry 1, and the paging message is sent from a port for connecting the forwarding plane gateway to the base station a and the base station b. According to the three action sets in the group entry 2, the destination MAC and the destination IP of the first paging message are separately set to addresses of the base station c, to addresses of the base station d, and to addresses of the base station e, and the paging message is sent from a port for connecting the forwarding plane gateway to the base station c, the base station d, and the base station e.

After receiving the second paging message, the base station a, the base station b, the base station c, the base station d, and the base station e page the UE according to information such as a user identifier and a paging index in the second paging message.

After receiving the second paging message from the base station a, the base station b, the base station c, the base station d, and the base station e, the UE responds to the second paging message, sends a service request to the control plane gateway by using the base station a, the base station b, the base station c, the base station d, and the base station e, and re-enters an activated state.

After sending the second paging message to the base station in the location area, the UE sends a service request to the control plane gateway by using the base station.

510. The forwarding plane gateway determines whether an instruction sent by the control plane gateway for setting the IP processing entry is received within a preset time, and if yes, performs step 511, or if no, performs step 513.

511. Update an action entry in the IP processing entry.

512. Send the downlink packet.

513. The forwarding plane gateway reports a paging timeout event to the control plane gateway.

514. The forwarding plane gateway receives an instruction sent by the control plane gateway for deleting the IP processing entry of the terminal.

515. The forwarding plane gateway deletes the IP processing entry of the UE and releases the downlink packet.

Processes of step 509 to step 515 in this embodiment are the same as processes of step 409 to step 415 shown in FIG. 4A and FIG. 4B. Details are not described in this embodiment.

It may be learned from this embodiment that, after UE enters an idle state, a downlink packet directly triggers a forwarding plane gateway to send a second paging message to a base station, and the forwarding plane gateway does not need to instruct a control plane gateway to trigger a paging message. Therefore, signaling interworking between the control plane gateway and the forwarding plane gateway is reduced, and a paging delay is shortened.

It should be further noted herein that, after the UE enters the idle state, because the UE may move from one location area to a new location area, that is, the UE moves from a current location area to an updated location area, to accurately determine the current location area of the UE, when the UE moves to the updated location area in the idle state, the UE initiates a location update procedure to a base station in the updated location area, and updates the current location area of the UE to the control plane gateway. The control plane gateway updates, according to the current location area of the UE, an association relationship that is between an IP processing entry and a group entry of the UE and that is in the forwarding plane gateway, and associates the IP processing entry of the UE with a group entry corresponding to the new location area.

If the UE enters the new location area and a paging parameter changes, a control plane gateway needs to update the paging message in the forwarding plane gateway. After a subsequent downlink packet arrives, a forwarding plane gateway may send a paging message to a base station in the new location area according to the modified association relationship between the IP processing entry and the group entry of the UE.

Because the control plane gateway can always track the current location area of the UE, the control plane gateway can control the forwarding plane gateway to correspondingly modify the association relationship between the IP processing entry and the group entry of the UE, so that the forwarding plane gateway can send a paging message to a base station in the current location area of the UE.

Figure 6:
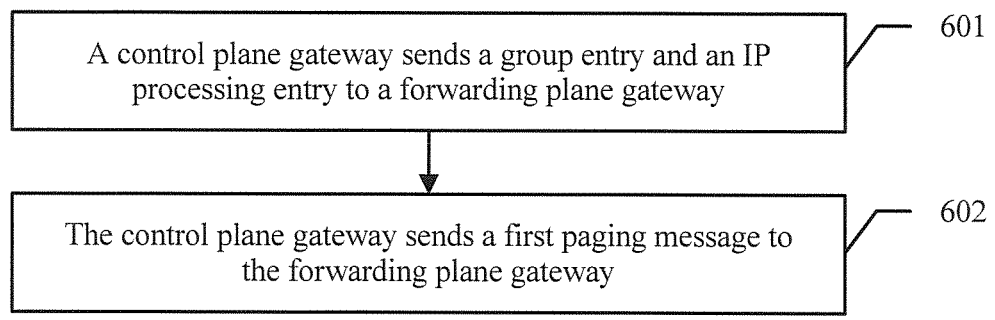
FIG. 6 is a step flowchart of an example of embodiments of a paging method according to an embodiment of the present invention.

With reference to an embodiment shown in FIG. 6, the following describes how the control plane gateway implements a paging method.

601. A control plane gateway sends a group entry and an IP processing entry to a forwarding plane gateway.

Specifically, the group entry is corresponding to the IP processing entry.

More specifically, the control plane gateway sends the IP processing entry to the forwarding plane gateway, so that when receiving a downlink packet sent by a network side, the forwarding plane gateway may determine, according to a destination address of the downlink packet, an IP processing entry corresponding to the downlink packet, and the forwarding plane gateway determines a group entry corresponding to the corresponding IP processing entry.

The group entry is used by the control plane gateway to instruct the forwarding plane gateway to encapsulate a first paging message.

602. The control plane gateway sends a first paging message to the forwarding plane gateway.

The control plane gateway sends the first paging message to the forwarding plane gateway, so that the forwarding plane gateway encapsulates the first paging message according to the determined group entry, that is, the forwarding plane gateway changes the first paging message to a second paging message according to the group entry and the IP processing entry. The second paging message is used for paging a terminal.

In the method according to this embodiment, a control plane gateway sends, to a forwarding plane gateway, a group entry and an IP processing entry corresponding to the group entry, and sends a first paging message. The forwarding plane gateway changes the first paging message to a second paging message according to the group entry and the IP processing entry, so that the forwarding plane gateway pages a terminal by using the second paging message, and a control plane gateway is not required to page the terminal. Therefore, a paging time is reduced.

Figure 7:
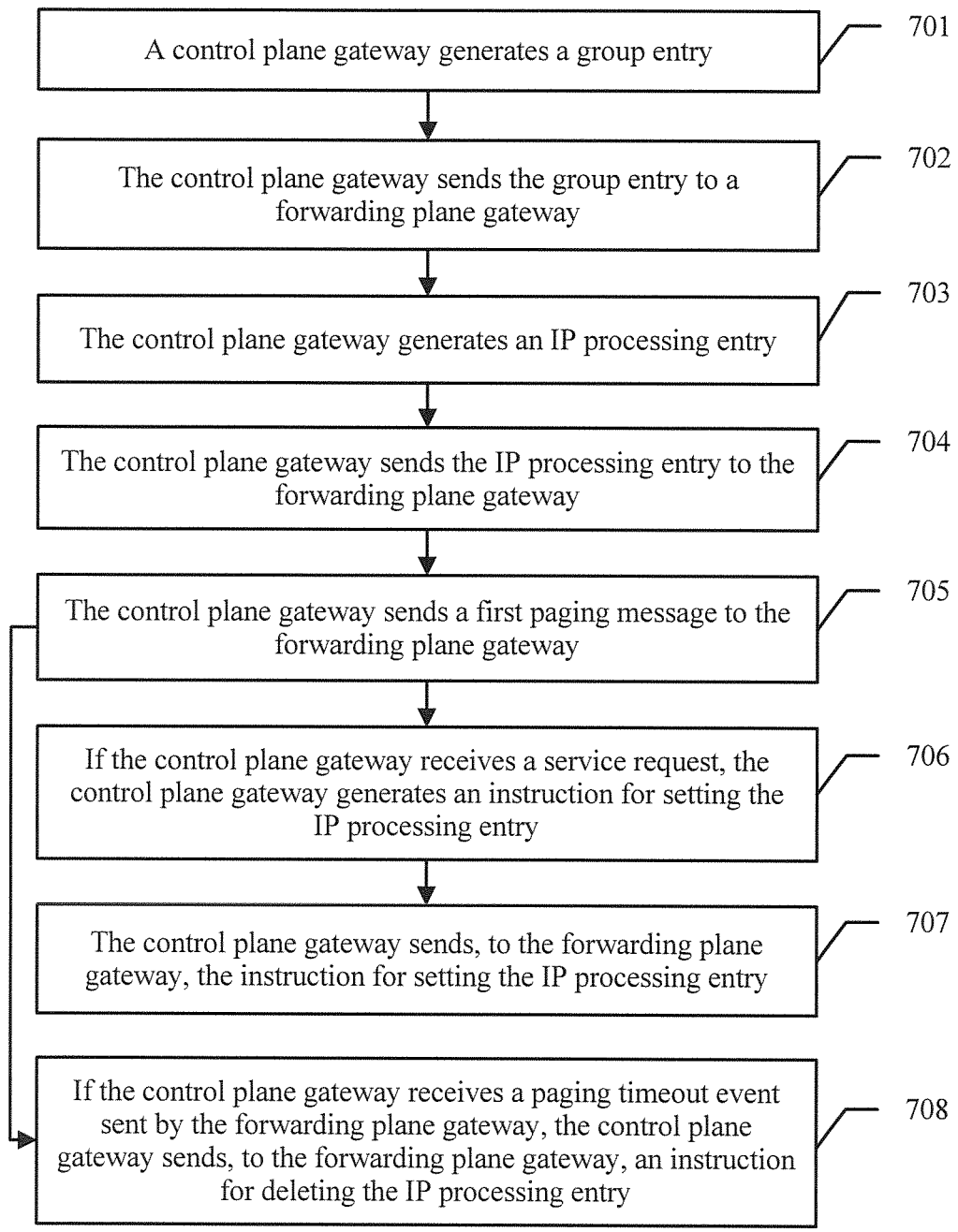
FIG. 7 is a step flowchart of another example of embodiments of a paging method according to an embodiment of the present invention.

With reference to an embodiment shown in FIG. 7, the following describes in detail how the control plane gateway specifically instructs the forwarding plane gateway to page a terminal.

701. A control plane gateway generates a group entry.

The control plane gateway configures the group entry for each location area, so that the group entry is corresponding to each location area.

The group entry may be in one-to-one correspondence with the location area, or one location area may be corresponding to multiple group entries, or one group entry is corresponding to multiple locations areas. A specific corresponding manner is not limited in this embodiment.

It should be noted that base station information corresponding to the terminal is an address of a base station in one or more location areas, and the one or more location areas include a current location area of the terminal.

In this embodiment, each group entry is corresponding to one location area, and each group entry is corresponding to one group entry identifier.

The group entry identifier is not limited in this embodiment. For example, the group entry identifier may be a tracking area identity (TAI) or a routing area identity (RAI). In an example of this embodiment, the group entry identifier is a tracking area identity (TAI).

For a format of the group entry generated by the control plane gateway, reference may be made to Table 6.

As shown in Table 6, Table 6 shows a format of a group entry. It may be learned from Table 6 that a mobile network includes two TAIs. A location area represented by a TAI 1 includes a base station a and a base station b, and a location area represented by a TAI 2 includes a base station c, a base station d, and a base station e.

TABLE 6

| Group entry identifier | Action entry set |
|---|---|
| 1 | Two action entries (a and b) are included |
| 2 | Three action entries (c, d, and e) are included |

The group entry identifier is used to index a group entry. The action entry set includes an operation performed on a paging message that is used for paging a terminal. Actions included in an action entry for the base station a may be: setting a destination MAC address of a first paging message to a MAC address of the base station a, setting a source MAC address of the first paging message to a MAC address of a forwarding plane gateway device, setting a destination IP address of the first paging message to an IP address of the base station a, setting a source IP address of the first paging message to an IP address of the forwarding plane gateway device, and outputting the first paging message from a port 1 (It is assumed that the base station a is connected to the forwarding plane gateway by using the port 1). Similarly, actions included in an action entry for another base station X may be: setting a destination MAC address of a first paging message to a MAC address of the base station X, setting a source MAC address of the first paging message to a MAC address of a forwarding plane gateway device, setting a destination IP address of the first paging message to an IP address of the base station X, setting a source IP address of the first paging message to an IP address of the forwarding plane gateway device, and outputting the first paging message from a port Y (It is assumed that the base station X is connected to the forwarding plane gateway by using the port Y).

It should be pointed out that the action entry herein is not unique. If the paging message is only encapsulated but not forwarded, it is only required to set a destination IP address of the first paging message to an IP address of a base station, so as to meet a requirement. Information such as a MAC address of a peer end and an output port may be subsequently determined according to the destination IP address by using another forwarding table. In addition, the action entry may also include modification actions for other L2 and L3 header fields, for example, adding a VLAN identifier or adding an MPLS label, and is not limited to modifying only a MAC address and an IP address.

702. The control plane gateway sends the group entry to a forwarding plane gateway.

703. The control plane gateway generates an IP processing entry.

In this embodiment, after UE enters an idle state, the base station sends a user context release message to the control plane gateway to instruct the UE to enter a control state. In this case, the control plane gateway determines a current location area of the UE. The location area includes a tracking location area or a routing location area. In this embodiment, the control plane gateway determines that the UE is located in the location area represented by the TAI 1.

The control plane gateway reconfigures the IP processing entry according to the location area of the UE.

The IP processing entry before the control plane gateway modifies the IP processing entry is shown in Table 7.

TABLE 7

| Match entry | Action | Content storage entry |
|---|---|---|
| Destination IP | Outer tunnel encapsulation | Empty |

The IP processing entry after the control plane gateway modifies the IP processing entry is shown in Table 8.

TABLE 8

| Match entry | Group entry identifier | Content storage entry |
|---|---|---|
| Destination IP | 1 | First paging message |

In this embodiment, the control plane gateway determines an IP address of UE that needs to be paged, and sets the determined IP address of the UE to the match entry.

When modifying the IP processing entry, the control plane gateway deletes an operation of encapsulating a downlink tunnel of the IP address and associates an IP processing entry for the UE with a group entry for the UE.

In this embodiment, an association relationship between the IP processing entry and the group entry is established by using the group entry identifier. That is, the IP processing entry includes a group entry identifier that is corresponding to the location area of the UE.

In this embodiment, because the control plane gateway determines that the UE is located in a location area corresponding to a group entry identifier 1, the control plane gateway adds the group entry identifier 1 to the IP processing entry when modifying the IP processing entry.

In this embodiment, the first paging message is a paging message that is delivered by the control plane gateway to the UE. In this embodiment, a specific quantity of the first paging message is not limited. That is, the forwarding plane gateway may simultaneously page at least one terminal.

704. The control plane gateway sends the IP processing entry to the forwarding plane gateway.

705. The control plane gateway sends a first paging message to the forwarding plane gateway.

The first paging message sent by the control plane gateway may include information such as a paging identifier (such as an S-TMSI) for the UE and a paging index required by the base station for paging.

Optionally, the paging message may include some information of an L2 or L3 header, for example, a source MAC address or a source IP address. The information is identical for all base stations in the location area.

After receiving the first paging message, the forwarding plane gateway may save the first paging message in the content storage entry in the IP processing entry shown in Table 8. The forwarding plane gateway determines a destination address of the downlink packet. Therefore, if the forwarding plane gateway determines that the destination address of the downlink packet is the same as the destination IP address in the match entry in the IP processing entry, the forwarding plane gateway can match the corresponding IP processing entry.

In this embodiment, the forwarding plane gateway may determine, according to the IP processing entry shown in Table 8, that a group entry identifier of the corresponding group entry is 1.

The control plane gateway instructs, by using the group entry identifier 1, the forwarding plane gateway to output the first paging message to the group entry whose group entry identifier is 1, so that the forwarding plane gateway executes an action entry corresponding to the group entry 1, as shown in Table 6.

After outputting the first paging message to the group entry of the location area corresponding to the UE and obtaining an address of a base station in the location area corresponding to the UE, the forwarding plane gateway sets, according to the group entry of the location area corresponding to the UE, the destination address of the first paging message outputted to the group entry to the address of the base station in the location area corresponding to the UE, so as to form a second paging message.

Changing the first paging message outputted to the group entry to the second paging message according to the action entry is changing the destination address of the first paging message to a destination address, included in the action entry, of the second paging message.

Specifically, a destination IP address of the first paging message outputted to the group entry is set to an IP address of the base station in the location area corresponding to the UE, and a source IP address of the first paging message outputted to the group entry is set to an IP address of the forwarding plane gateway; a destination MAC address of the first paging message outputted to the group entry is set to a MAC address of the base station in the location area corresponding to the UE, and a source MAC address of the first paging message outputted to the group entry is set to a MAC address of the forwarding plane gateway; and an output port is selected for the first paging message outputted to the group entry, and the output port is a port for connecting the forwarding plane gateway and the base station in the location area corresponding to the UE.

That is, the second paging message is the first paging message whose destination address has been changed according to the action entry.

Therefore, the forwarding plane gateway pages the terminal by using the generated second paging message. Specifically, after the forwarding plane gateway sets, according to the group entry of the location area corresponding to the UE, the destination address of the first paging message outputted to the group entry to the address of the base station in the location area corresponding to the UE, the forwarding plane gateway sends the second paging message to the base station in the location area according to the address of the base station in the location area corresponding to the UE.

The group entry shown in Table 6 in this embodiment is used as an example. The location area corresponding to the UE is corresponding to a group entry 1, and the first paging message is sent to the corresponding group entry 1. The destination MAC and the destination IP of the first paging message are separately set to addresses of the base station a and to addresses of the base station b according to the two action sets in the group entry 1, and the paging message is sent from a port for connecting the forwarding plane gateway to the base station a and the base station b. The forwarding plane gateway sends the second paging message to the base station a and the base station b each. The second paging messages have a same paging message body, but the destination MAC and the destination IP of the second paging message sent to the base station a are the addresses of the base station a, and the destination MAC and the destination IP of the second paging message sent to the base station b are the addresses of the base station b. After receiving the second paging message, the base station a and the base station b page the UE according to information such as a user identifier and a paging index in the second paging message.

After receiving the second paging message from the base station a and the base station b, the UE responds to the second paging message, sends a service request to the control plane gateway by using the base station a and the base station b, and re-enters an activated state.

After sending the second paging message to the base station in the location area, the UE sends a service request to the control plane gateway by using the base station.

706. If the control plane gateway receives a service request, the control plane gateway generates an instruction for setting the IP processing entry.

Specifically, the control plane gateway sends, to the forwarding plane gateway according to the service request, the instruction for setting the IP processing entry. The instruction for setting the IP processing entry is used for setting the action entry in the IP processing entry of the UE to outer tunnel encapsulation.

707. The control plane gateway sends, to the forwarding plane gateway, the instruction for setting the IP processing entry.

The control plane gateway instructs, by using the instruction for setting the IP processing entry, the forwarding plane gateway to set, according to the instruction for setting the IP processing entry, the action entry in the IP processing entry of the UE to outer tunnel encapsulation.

After setting the action entry in the IP processing entry of the UE to outer tunnel encapsulation, the forwarding plane gateway encapsulates the downlink packet according to the IP processing entry of the UE, and sends the buffered downlink packet to the UE by using a base station that is in the location area and that sends the service request of the UE.

Briefly, when the control plane gateway receives the service request sent by the UE by using the base station, the control plane gateway updates the IP processing entry of the UE that is in the forwarding plane gateway, so that the forwarding plane gateway re-generates a downlink tunnel encapsulation action for the IP processing entry of the UE. In this process, the first paging message stored in the IP processing entry of the UE may be deleted.

708. If the control plane gateway receives a paging timeout event sent by the forwarding plane gateway, the control plane gateway sends, to the forwarding plane gateway, an instruction for deleting the IP processing entry.

If the forwarding plane gateway determines that the instruction sent by the control plane gateway for setting the IP processing entry is not received within a preset time, the forwarding plane gateway reports the paging timeout event to the control plane gateway, and the control plane gateway sends, to the forwarding plane gateway according to the paging timeout event, the instruction for deleting the IP processing entry of the UE, so that the forwarding plane gateway deletes the IP processing entry and releases the downlink packet.

It may be learned from this embodiment that, after UE enters an idle state, a downlink packet directly triggers a forwarding plane gateway to send a second paging message to a base station, and a control plane gateway instructs, by sending a group entry and an IP processing entry, the forwarding plane gateway to change a first paging message, so as to change the first paging message to the second paging message that is used for paging a terminal. The forwarding plane gateway does not need to instruct the control plane gateway to trigger a paging message. Therefore, signaling interworking between the control plane gateway and the forwarding plane gateway is reduced, and a paging delay is shortened.

Figure 8:
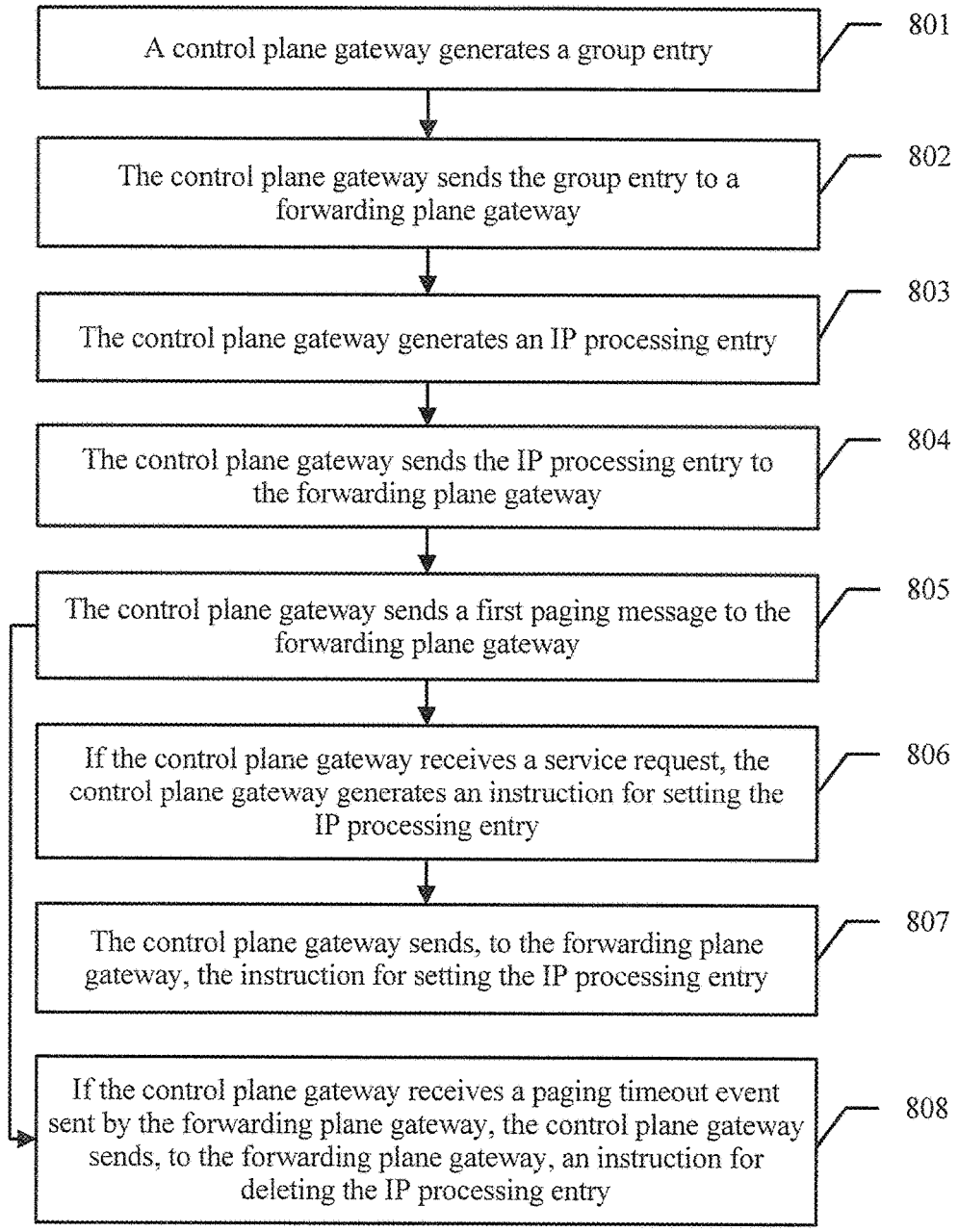
FIG. 8 is a step flowchart of another example of embodiments of a paging method according to an embodiment of the present invention.

According to the embodiment shown in FIG. 7, the group entry that is of the location area corresponding to the UE and that is associated with the IP processing entry of the UE may be one group entry corresponding to an included action set. In the following descriptions with reference to an embodiment shown in FIG. 8, the group entry that is of the location area corresponding to the UE and that is associated with the IP processing entry of the UE may be multiple group entries corresponding to an included action set.

801. A control plane gateway generates a group entry.

The control plane gateway configures the group entry for each location area, so that the group entry is corresponding to each location area.

The group entry may be in one-to-one correspondence with the location area, or one location area may be corresponding to multiple group entries, or one group entry is corresponding to multiple locations. A specific corresponding manner is not limited in this embodiment.

It should be noted that base station information corresponding to the terminal is an address of a base station in one or more location areas, and the one or more location areas include a current location area of the terminal.

In this embodiment, each group entry is corresponding to one location area, and each group entry is corresponding to one group entry identifier.

The group entry identifier is not limited in this embodiment. For example, the group entry identifier may be a tracking area identity (TAI) or a routing area identity (RAI). In an example of this embodiment, the group entry identifier is a tracking area identity (TAI).

In this embodiment, the group entry generated by the control plane gateway may be shown in Table 9.

TABLE 9

| Group entry identifier | Action entry set |
|---|---|
| 1 | Two action entries (a and b) are included |
| 2 | Three action entries (c, d, and e) are included |
| 3 | Two action entries are included, separately corresponding to a group entry 1 and a group entry 2 |

An action entry set in a group entry 3 includes two action entries. The two action entries are separately corresponding to the group entry 1 and the group entry 2.

The group entry identifier is used to index a group entry. The action entry set includes an operation performed on a paging message that is used for paging a terminal. Actions included in an action entry for the base station a may be: setting a destination MAC address of a first paging message to a MAC address of the base station a, setting a source MAC address of the first paging message to a MAC address of a forwarding plane gateway device, setting a destination IP address of the first paging message to an IP address of the base station a, setting a source IP address of the first paging message to an IP address of the forwarding plane gateway device, and outputting the first paging message from a port 1 (It is assumed that the base station a is connected to the forwarding plane gateway by using the port 1). Similarly, actions included in an action entry for another base station X may be: setting a destination MAC address of a first paging message to a MAC address of the base station X, setting a source MAC address of the first paging message to a MAC address of a forwarding plane gateway device, setting a destination IP address of the first paging message to an IP address of the base station X, setting a source IP address of the first paging message to an IP address of the forwarding plane gateway device, and outputting the first paging message from a port Y (It is assumed that the base station X is connected to the forwarding plane gateway by using the port Y).

It should be pointed out that the action entry herein is not unique. If the paging message is only encapsulated but not forwarded, it is only required to set a destination IP address of the first paging message to an IP address of a base station, so as to meet a requirement. Information such as a MAC address of a peer end and an output port may be subsequently determined according to the destination IP address by using another forwarding table. In addition, the action entry may also include modification actions for other L2 and L3 header fields, for example, adding a VLAN identifier or adding an MPLS label, and is not limited to modifying only a MAC address and an IP address.

802. The control plane gateway sends the group entry to a forwarding plane gateway.

803. The control plane gateway generates an IP processing entry.

In this embodiment, after UE enters an idle state, the base station sends a user context release message to the control plane gateway to instruct the UE to enter a control state. In this case, the control plane gateway determines a current location area of the UE. The location area includes a tracking location area or a routing location area. In this embodiment, the control plane gateway determines that the UE is located in a location area represented by a TAI 1.

The control plane gateway reconfigures the IP processing entry according to the location area of the UE.

The IP processing entry after the control plane gateway modifies the IP processing entry is shown in Table 10.

TABLE 10

| Match entry | Group entry identifier | Content storage entry |
|---|---|---|
| Destination IP | 3 | First paging message |

In this embodiment, the control plane gateway determines an IP address of UE that needs to be paged, and sets the determined IP address of the UE to the match entry.

When modifying the IP processing entry, the control plane gateway deletes an operation of encapsulating a downlink tunnel of the IP address and associates an IP processing entry for the UE with a group entry for the UE.

In this embodiment, an association relationship between the IP processing entry and the group entry is established by using the group entry identifier. That is, the IP processing entry includes a group entry identifier that is corresponding to the location area of the UE.

In this embodiment, because the control plane gateway determines that the UE is located in a location area corresponding to a group entry identifier 3, the control plane gateway adds the group entry identifier 3 to the IP processing entry when modifying the IP processing entry.

In this embodiment, the first paging message is a paging message that is delivered by the control plane gateway to the UE. In this embodiment, a specific quantity of the first paging message is not limited. That is, the forwarding plane gateway may simultaneously page at least one terminal.

804. The control plane gateway sends the IP processing entry to the forwarding plane gateway.

805. The control plane gateway sends a first paging message to the forwarding plane gateway.

The first paging message sent by the control plane gateway may include information such as a paging identifier (such as an S-TMSI) for the UE and a paging index required by the base station for paging.

Optionally, the paging message may include some information of an L2 or L3 header, for example, a source MAC address or a source IP address. The information is identical for all base stations in the location area.

After receiving the first paging message, the forwarding plane gateway may save the first paging message in the content storage entry in the IP processing entry shown in Table 10. The forwarding plane gateway determines a destination address of the downlink packet. Therefore, if the forwarding plane gateway determines that the destination address of the downlink packet is the same as the destination IP address in the match entry in the IP processing entry, the forwarding plane gateway can match the corresponding IP processing entry.

In this embodiment, the forwarding plane gateway may determine, according to the IP processing entry shown in Table 10, that a group entry identifier of the corresponding group entry is 3.

The control plane gateway instructs, by using the group entry identifier 3, the forwarding plane gateway to output the first paging message to the group entry whose group entry identifier is 3, so that the forwarding plane gateway executes an action entry corresponding to the group entry 3, as shown in Table 9.

After outputting the first paging message to the group entry of the location area corresponding to the UE and obtaining an address of a base station in the location area corresponding to the UE, the forwarding plane gateway sets, according to the group entry of the location area corresponding to the UE, a destination address of the first paging message outputted to the group entry to the address of the base station in the location area corresponding to the UE, so as to form the second paging message.

Changing the first paging message outputted to the group entry to the second paging message according to the action entry is changing the destination address of the first paging message to a destination address, included in the action entry, of the second paging message.

Specifically, a destination IP address of the first paging message outputted to the group entry is set to an IP address of the base station in the location area corresponding to the UE, and a source IP address of the first paging message outputted to the group entry is set to an IP address of the forwarding plane gateway; a destination MAC address of the first paging message outputted to the group entry is set to a MAC address of the base station in the location area corresponding to the UE, and a source MAC address of the first paging message outputted to the group entry is set to a MAC address of the forwarding plane gateway; and an output port is selected for the first paging message outputted to the group entry, and the output port is a port for connecting the forwarding plane gateway and the base station in the location area corresponding to the UE.

That is, the second paging message is the first paging message whose destination address has been changed according to the action entry.

The group entry shown in Table 9 in this embodiment is used as an example. The location area corresponding to the UE is corresponding to the group entry 3, and the first paging message is sent to the corresponding group entry 1 and group entry 2. The destination MAC and the destination IP of the first paging message are separately set to addresses of the base station a and to addresses of the base station b according to the two action sets in the group entry 1, and the paging message is sent from a port for connecting the forwarding plane gateway to the base station a and the base station b. According to the three action sets in the group entry 2, the destination MAC and the destination IP of the first paging message are separately set to addresses of the base station c, to addresses of the base station d, and to addresses of the base station e, and the paging message is sent from a port for connecting the forwarding plane gateway to the base station c, the base station d, and the base station e.

After receiving the second paging message, the base station a, the base station b, the base station c, the base station d, and the base station e page the UE according to information such as a user identifier and a paging index in the second paging message.

After receiving the second paging message from the base station a, the base station b, the base station c, the base station d, and the base station e, the UE responds to the second paging message, sends a service request to the control plane gateway by using the base station a, the base station b, the base station c, the base station d, and the base station e, and re-enters an activated state.

After sending the second paging message to the base station in the location area, the UE sends a service request to the control plane gateway by using the base station.

806. If the control plane gateway receives a service request, the control plane gateway generates an instruction for setting the IP processing entry.

807. The control plane gateway sends, to the forwarding plane gateway, the instruction for setting the IP processing entry.

808. If the control plane gateway receives a paging timeout event sent by the forwarding plane gateway, the control plane gateway sends, to the forwarding plane gateway, an instruction for deleting the IP processing entry.

Processes of step 806 to step 808 in this embodiment are the same as processes of step 706 to step 708 in FIG. 7. Details are not described in this embodiment.

It may be learned from this embodiment that, after UE enters an idle state, a downlink packet directly triggers a forwarding plane gateway to send a second paging message to a base station, and a control plane gateway instructs, by sending a group entry and an IP processing entry, the forwarding plane gateway to change a first paging message, so as to change the first paging message to the second paging message that is used for paging a terminal. The forwarding plane gateway does not need to instruct the control plane gateway to trigger a paging message. Therefore, signaling interworking between the control plane gateway and the forwarding plane gateway is reduced, and a paging delay is shortened.

Figure 9:
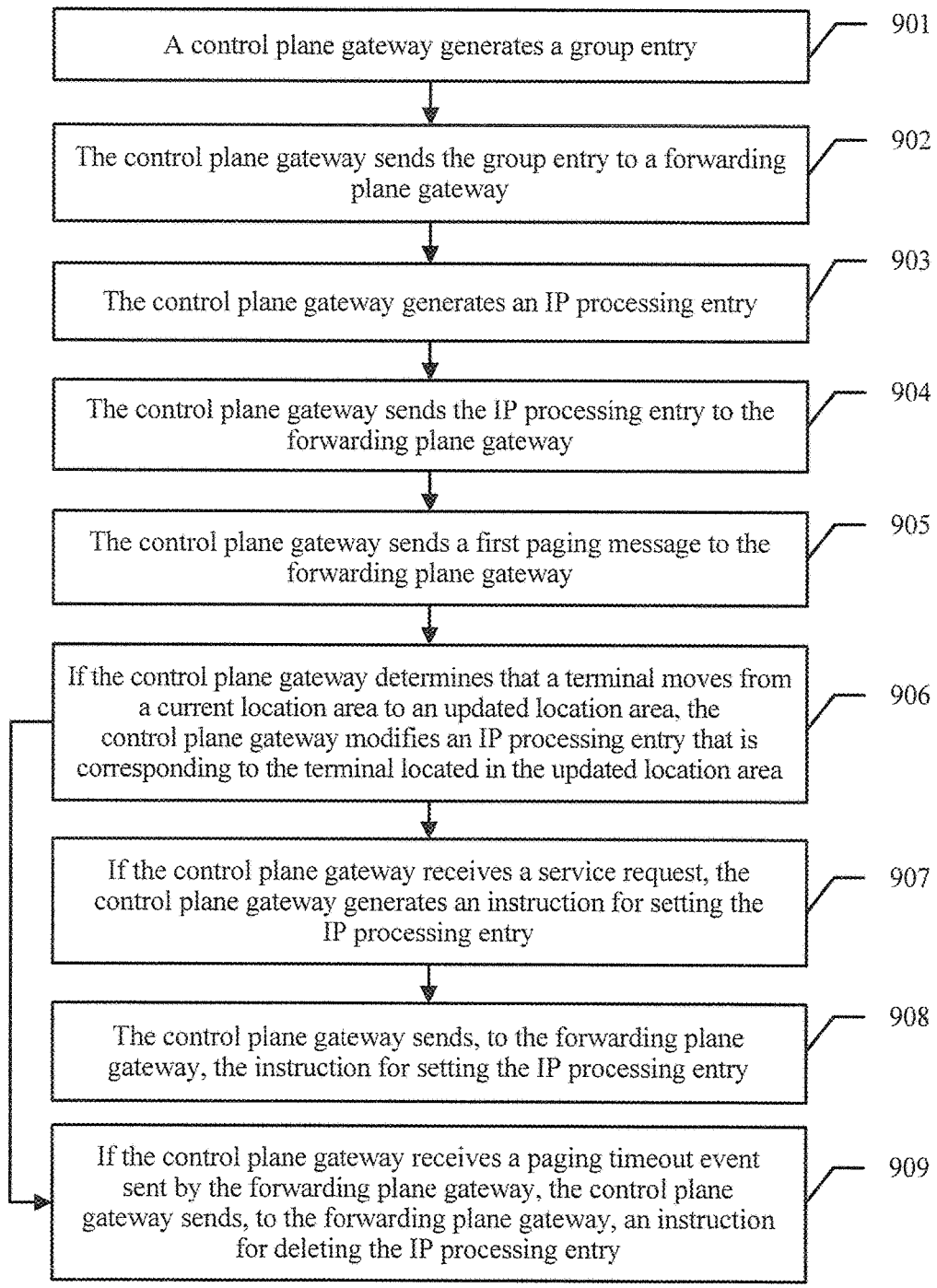
FIG. 9 is a step flowchart of another example of embodiments of a paging method according to an embodiment of the present invention.

With reference to an embodiment shown in FIG. 9, the following describes how a control plane gateway implements a paging method if UE moves from a current location area to an updated location area.

901. A control plane gateway generates a group entry.

902. The control plane gateway sends the group entry to a forwarding plane gateway.

903. The control plane gateway generates an IP processing entry.

904. The control plane gateway sends the IP processing entry to the forwarding plane gateway.

905. The control plane gateway sends a first paging message to the forwarding plane gateway.

For specific processes of step 901 to step 905 in this embodiment, refer to step 701 to step 705 shown in FIG. 7. The specific processes are not described in this embodiment.

906. If the control plane gateway determines that a terminal moves from a current location area to an updated location area, the control plane gateway modifies an IP processing entry that is corresponding to the terminal located in the updated location area.

After the UE enters an idle state, because the UE may move from one location area to a new location area, that is, the UE moves from the current location area to the updated location area, to accurately determine the current location area of the UE, when the UE moves to the updated location area in the idle state, the UE initiates a location update procedure to a base station in the updated location area, and updates the current location area of the UE to the control plane gateway, so that the control plane gateway determines the updated location area of the UE after the movement.

After the control plane gateway determines that the UE is located in the updated location area, the control plane gateway modifies, according to an IP address of the UE located in the updated location area, an IP processing entry corresponding to a terminal located in the updated location area. The control plane gateway updates, according to the updated location area of the UE, an association relationship that is between the IP processing entry and the group entry of the UE and that is in the forwarding plane gateway, and associates the IP processing entry of the UE with a group entry corresponding to the updated location area, so that the terminal located in the updated location area can be paged by using the group entry corresponding to the modified IP processing entry.

After the forwarding plane gateway receives the new association relationship between the IP processing entry and the group entry, the forwarding plane gateway determines a destination address of the downlink packet. Therefore, if the forwarding plane gateway determines that the destination address of the downlink packet is the same as a destination IP address in a match entry in the IP processing entry, the forwarding plane gateway can match the corresponding IP processing entry.

After outputting the first paging message to the group entry of the updated location area corresponding to the UE and obtaining an address of a base station in the updated location area corresponding to the UE, the forwarding plane gateway sets, according to the group entry of the updated location area corresponding to the UE, a destination address of the first paging message outputted to the group entry to the address of the base station in the updated location area corresponding to the UE, so as to form the second paging message.

Changing the first paging message outputted to the group entry to the second paging message according to an action entry is changing the destination address of the first paging message to a destination address, included in the action entry, of the second paging message.

Specifically, a destination IP address of the first paging message outputted to the group entry is set to an IP address of the base station in the updated location area corresponding to the UE, and a source IP address of the first paging message outputted to the group entry is set to an IP address of the forwarding plane gateway; a destination MAC address of the first paging message outputted to the group entry is set to a MAC address of the base station in the updated location area corresponding to the UE, and a source MAC address of the first paging message outputted to the group entry is set to a MAC address of the forwarding plane gateway; and an output port is selected for the first paging message outputted to the group entry, and the output port is a port for connecting the forwarding plane gateway and the base station in the updated location area corresponding to the UE.

That is, the second paging message is the first paging message whose destination address has been changed according to the action entry.

Therefore, the forwarding plane gateway pages the terminal by using the generated second paging message. Specifically, after the forwarding plane gateway sets, according to the group entry of the updated location area corresponding to the UE, the destination address of the first paging message outputted to the group entry to the address of the base station in the updated location area corresponding to the UE, the forwarding plane gateway sends the second paging message to the base station in the updated location area according to the address of the base station in the updated location area corresponding to the UE.

After receiving the second paging message from the base station in the updated location area, the UE responds to the second paging message, sends a service request to the control plane gateway by using the base station in the updated location area, and re-enters an activated state.

After sending the second paging message to the base station in the updated location area, the UE sends the service request to the control plane gateway by using the base station in the updated location area.

If the control plane gateway determines that a paging parameter of the terminal located in the updated location area changes, the control plane gateway modifies an IP processing entry that is corresponding to the terminal whose paging parameter has changed and that is located in the updated location area, updates the first paging message buffered in the IP processing entry, and sends the updated first paging message to the forwarding plane gateway.

907. If the control plane gateway receives a service request, the control plane gateway generates an instruction for setting the IP processing entry.

Specifically, the control plane gateway sends, to the forwarding plane gateway according to the service request, the instruction for setting the IP processing entry. The instruction for setting the IP processing entry is used for setting the action entry in the IP processing entry of the UE to outer tunnel encapsulation.

908. The control plane gateway sends, to the forwarding plane gateway, the instruction for setting the IP processing entry.

The control plane gateway instructs, by using the instruction for setting the IP processing entry, the forwarding plane gateway to set, according to the instruction for setting the IP processing entry, the action entry in the IP processing entry of the UE to outer tunnel encapsulation.

After setting the action entry in the IP processing entry of the UE to outer tunnel encapsulation, the forwarding plane gateway encapsulates the downlink packet according to the IP processing entry of the UE, and sends the buffered downlink packet to the UE by using a base station that is in the updated location area and that sends the service request of the UE.

Briefly, when the control plane gateway receives the service request sent by the UE by using the base station, the control plane gateway updates the IP processing entry of the UE that is in the forwarding plane gateway, so that the forwarding plane gateway re-generates a downlink tunnel encapsulation action for the IP processing entry of the UE. In this process, the first paging message stored in the IP processing entry of the UE may be deleted.

909. If the control plane gateway receives a paging timeout event sent by the forwarding plane gateway, the control plane gateway sends, to the forwarding plane gateway, an instruction for deleting the IP processing entry.

If the forwarding plane gateway determines that the instruction sent by the control plane gateway for setting the IP processing entry is not received within a preset time, the forwarding plane gateway reports the paging timeout event to the control plane gateway, and the control plane gateway sends, to the forwarding plane gateway according to the paging timeout event, the instruction for deleting the IP processing entry of the UE, so that the forwarding plane gateway deletes the IP processing entry and releases the downlink packet.

It may be learned from this embodiment that, when UE moves from a current location area to an updated location area, a control plane gateway modifies an IP processing entry that is corresponding to a terminal located in the updated location area, so that the terminal located in the updated location area can be paged by using a group entry that is corresponding to the modified IP processing entry. In addition, after the UE enters an idle state, a downlink packet directly triggers a forwarding plane gateway to send a second paging message to a base station, and the control plane gateway instructs, by sending the group entry and the IP processing entry, the forwarding plane gateway to change a first paging message, so as to change the first paging message to the second paging message that is used for paging the terminal, so that the forwarding plane gateway pages, by using the second paging message, the terminal located in the updated location area, and the forwarding plane gateway does not need to instruct the control plane gateway to trigger a paging message. Therefore, signaling interworking between the control plane gateway and the forwarding plane gateway is reduced, and a paging delay is shortened.

Figure 10:
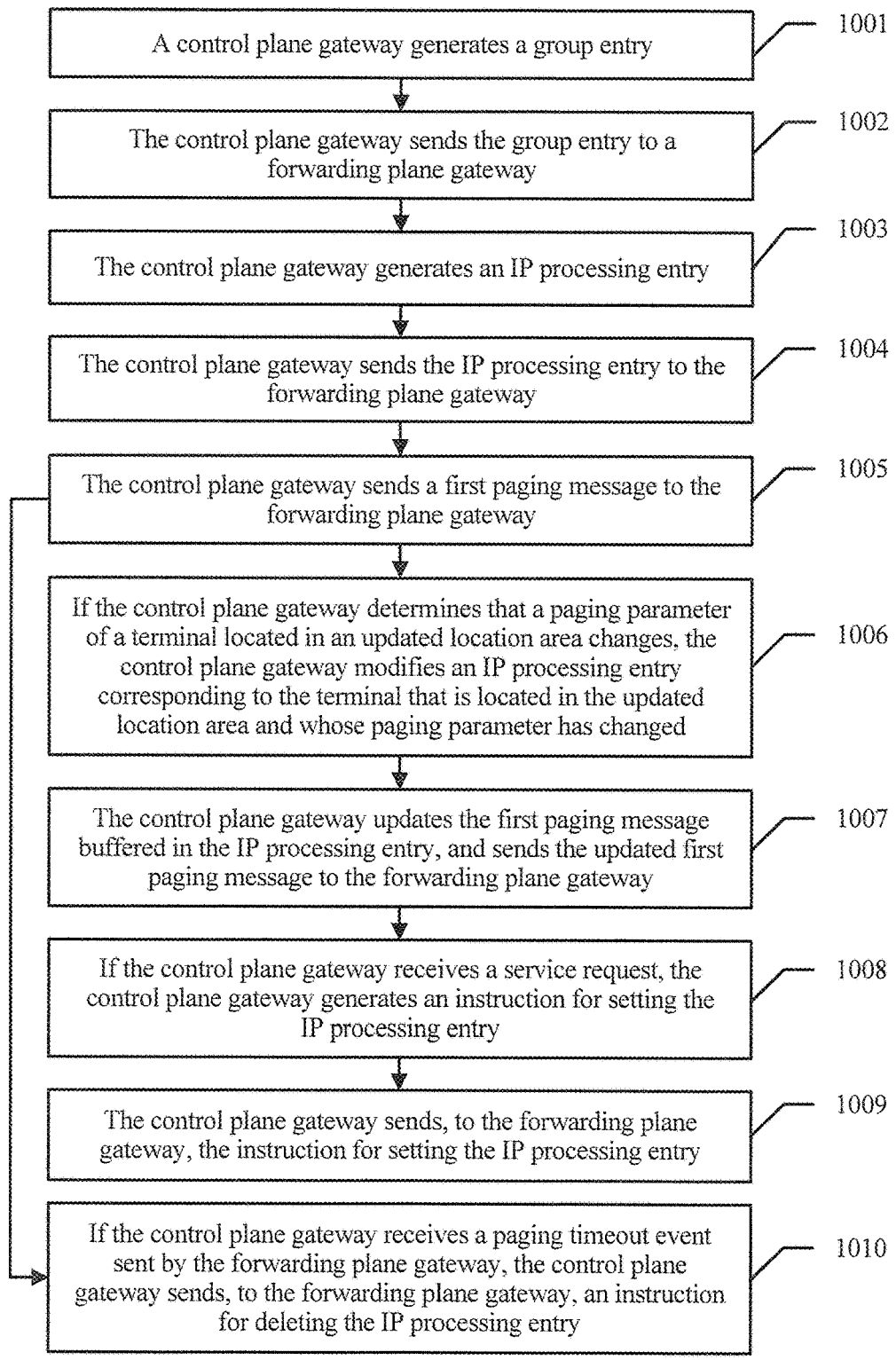
FIG. 10 is a step flowchart of another example of embodiments of a paging method according to an embodiment of the present invention.

With reference to an embodiment shown in FIG. 10, the following describes how the control plane gateway performs paging when determining that a paging parameter of a terminal changes.

1001. A control plane gateway generates a group entry.

1002. The control plane gateway sends the group entry to a forwarding plane gateway.

1003. The control plane gateway generates an IP processing entry.

1004. The control plane gateway sends the IP processing entry to the forwarding plane gateway.

1005. The control plane gateway sends a first paging message to the forwarding plane gateway.

Processes of step 1001 to step 1005 in this embodiment are the same as processes of step 701 to step 705 shown in FIG. 7. Details are not described in this embodiment.

1006. If the control plane gateway determines that a paging parameter of a terminal located in an updated location area changes, the control plane gateway modifies an IP processing entry corresponding to the terminal that is located in the updated location area and whose paging parameter has changed.

The updated location area in this embodiment is a current location area of the terminal.

The control plane gateway determines the IP processing entry that is corresponding to the terminal located in the updated location area.

1007. The control plane gateway updates the first paging message buffered in the IP processing entry, and sends the updated first paging message to the forwarding plane gateway.

In this embodiment, the control plane gateway correspondingly generates, according to the terminal located in the updated location area, the first paging message that is used for paging the terminal, and the control plane gateway updates the first paging message to the IP processing entry that is corresponding to the terminal located in the updated location area, and delivers the first paging message to the forwarding plane gateway, so that the forwarding plane gateway can correspondingly generate a second paging message according to the updated first paging message, and the terminal that is located in the updated location area and whose paging parameter has changed can be paged by using the re-generated second paging message.

1008. If the control plane gateway receives a service request, the control plane gateway generates an instruction for setting the IP processing entry.

Specifically, the control plane gateway sends, to the forwarding plane gateway according to the service request, the instruction for setting the IP processing entry. The instruction for setting the IP processing entry is used for setting an action entry in the IP processing entry of the UE to outer tunnel encapsulation.

1009. The control plane gateway sends, to the forwarding plane gateway, the instruction for setting the IP processing entry.

The control plane gateway instructs, by using the instruction for setting the IP processing entry, the forwarding plane gateway to set, according to the instruction for setting the IP processing entry, the action entry in the IP processing entry of the UE to outer tunnel encapsulation.

After setting the action entry in the IP processing entry of the UE to outer tunnel encapsulation, the forwarding plane gateway encapsulates the downlink packet according to the IP processing entry of the UE, and sends the buffered downlink packet to the UE by using a base station that is in the updated location area and that sends the service request of the UE.

Briefly, when the control plane gateway receives the service request sent by the UE by using the base station, the control plane gateway updates the IP processing entry of the UE that is in the forwarding plane gateway, so that the forwarding plane gateway re-generates a downlink tunnel encapsulation action for the IP processing entry of the UE. In this process, the updated first paging message stored in the IP processing entry of the UE may be deleted.

1010. If the control plane gateway receives a paging timeout event sent by the forwarding plane gateway, the control plane gateway sends, to the forwarding plane gateway, an instruction for deleting the IP processing entry.

If the forwarding plane gateway determines that the instruction sent by the control plane gateway for setting the IP processing entry is not received within a preset time, the forwarding plane gateway reports the paging timeout event to the control plane gateway, and the control plane gateway sends, to the forwarding plane gateway according to the paging timeout event, the instruction for deleting the IP processing entry of the UE, so that the forwarding plane gateway deletes the IP processing entry and releases the downlink packet.

It may be learned from this embodiment that a control plane gateway determines that a paging parameter of a terminal located in an updated location area changes, and then modifies an IP processing entry corresponding to the terminal that is located in the updated location area and whose paging parameter has changed, and updates a first paging message buffered in the IP processing entry, so that a forwarding plane gateway re-generates a second paging message by using the updated first paging message, the terminal whose paging parameter has changed can be paged by using the re-generated second paging message, and during paging, the forwarding plane gateway does not need to instruct the control plane gateway to trigger a paging message. Therefore, signaling interworking between the control plane gateway and the forwarding plane gateway is reduced, and a paging delay is shortened.

Figure 11:
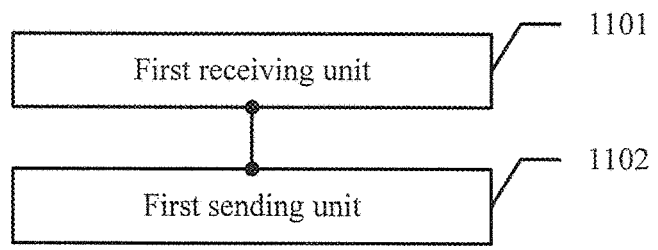
FIG. 11 is a schematic structural diagram of an example of embodiments of a forwarding plane gateway device according to an embodiment of the present invention.

An embodiment of the present invention further provides a forwarding plane gateway device. As shown in FIG. 11, the forwarding plane gateway device includes:

a first receiving unit 1101, configured to receive a downlink packet, where the first receiving unit 1101 receives the downlink packet from a network side; and a first sending unit 1102, configured to send a second paging message to at least one base station according to the downlink packet, where the second paging message is used for paging a terminal.

The forwarding plane gateway determines the second paging message according to the received downlink packet. How the forwarding plane gateway specifically determines the second paging message is not limited in this embodiment provided that the second paging message can page a terminal.

In the method according to this embodiment, a second paging message is determined by using a user packet received by a forwarding plane gateway, so that the forwarding plane gateway pages a terminal by using the second paging message, and a control plane gateway is not required to page the terminal. Therefore, a paging time is reduced.

Figure 12:
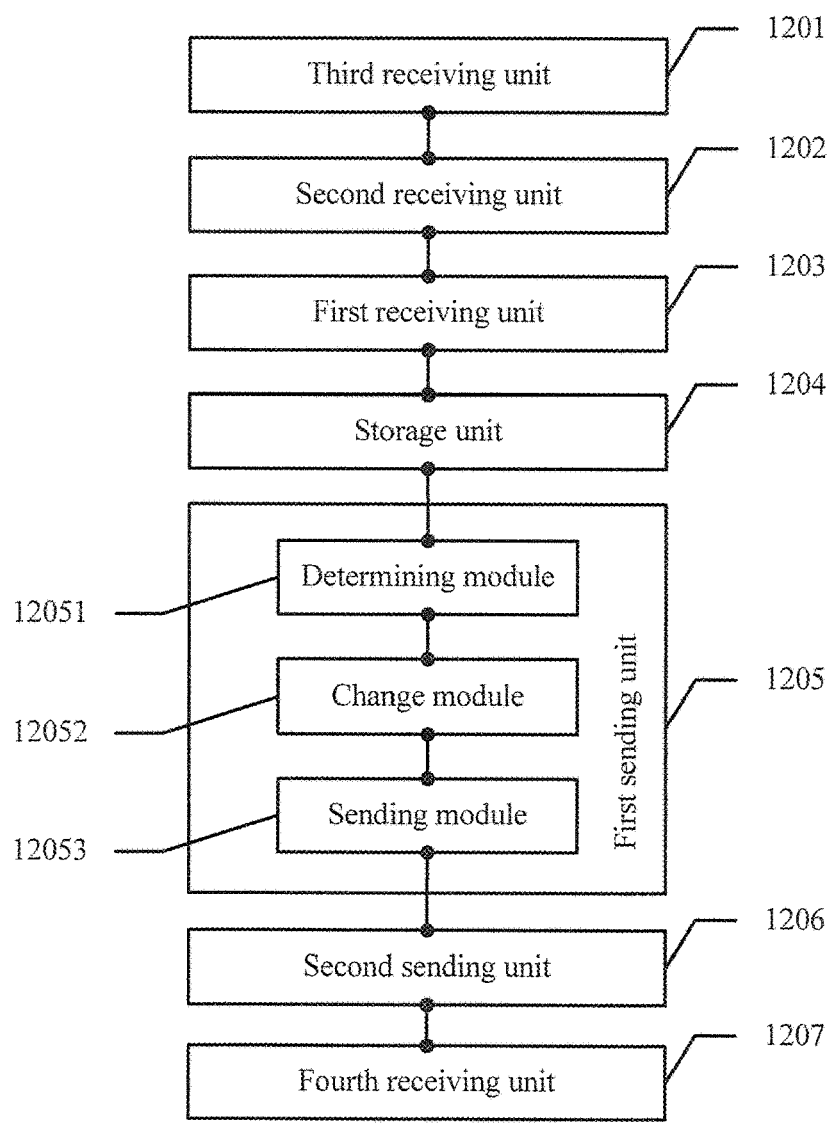
FIG. 12 is a schematic structural diagram of another example of embodiments of a forwarding plane gateway device according to an embodiment of the present invention.

With reference to FIG. 12, the following further describes a specific structure of the forwarding plane gateway device in detail.

The forwarding plane gateway device specifically includes: a third receiving unit 1201, a second receiving unit 1202, a first receiving unit 1203, a storage unit 1204, a first sending unit 1205, a second sending unit 1206, and a fourth receiving unit 1207.

The third receiving unit 1201 is configured to receive a group entry and an IP processing entry that are sent by the control plane gateway.

The control plane gateway configures the group entry for each location area, so that the group entry is corresponding to each location area.

The group entry may be in one-to-one correspondence with the location area, or one location area may be corresponding to multiple group entries, or one group entry is corresponding to multiple location areas. A specific corresponding manner is not limited in this embodiment.

It should be noted that base station information corresponding to the terminal is an address of a base station in one or more location areas, and the one or more location areas include a current location area of the terminal.

In this embodiment, each group entry is corresponding to one location area, and each group entry is corresponding to one group entry identifier.

The group entry identifier is not limited in this embodiment. For example, the group entry identifier may be a tracking area identity (TAI) or a routing area identity (RAI). In an example of this embodiment, the group entry identifier is a tracking area identity (TAI).

The group entry identifier is used to index a group entry. An action entry set includes an operation performed on a paging message that is used for paging a terminal.

It should be pointed out that the action entry herein is not unique. If the paging message is only encapsulated but not forwarded, it is only required to set a destination IP address of the first paging message to an IP address of a base station, so as to meet a requirement. Information such as a MAC address of a peer end and an output port may be subsequently determined according to the destination IP address by using another forwarding table. In addition, the action entry may also include modification actions for other L2 and L3 header fields, for example, adding a VLAN identifier or adding an MPLS label, and is not limited to modifying only a MAC address and an IP address.

In this embodiment, after UE enters an idle state, the base station sends a user context release message to the control plane gateway to instruct the UE to enter a control state. In this case, the control plane gateway determines a current location area of the UE. The location area includes a tracking location area or a routing location area.

In this embodiment, an association relationship between the IP processing entry and the group entry is established by using the group entry identifier. That is, the IP processing entry includes a group entry identifier that is corresponding to the location area of the UE.

In this embodiment, because the control plane gateway determines that the UE is located in a location area corresponding to a group entry identifier 1, the control plane gateway adds the group entry identifier 1 to the IP processing entry when modifying the IP processing entry.

In this embodiment, the first paging message is a paging message that is delivered by the control plane gateway to the UE. In this embodiment, a specific quantity of the first paging message is not limited. That is, the forwarding plane gateway may simultaneously page at least one terminal.

The second receiving unit 1202 is configured to receive a first paging message sent by a control plane gateway.

The first paging message received by the forwarding plane gateway may include information such as a paging identifier (such as an S-TMSI) for the UE and a paging index required by the base station for paging.

Optionally, the paging message may include some information of an L2 or L3 header, for example, a source MAC address or a source IP address. The information is identical for all base stations in the location area.

The first receiving unit 1203 is configured to receive a downlink packet.

The storage unit 1204 is configured to buffer the downlink packet.

The first sending unit 1205 is configured to send a second paging message to at least one base station according to the downlink packet, where the second paging message is used for paging a terminal.

Specifically, the first sending unit 1205 is further configured to: determine a destination address of the second paging message according to a destination address of the downlink packet, and send the second paging message to the at least one base station according to the destination address of the second paging message.

More specifically, the first sending unit 1205 includes:

a determining module 12051, configured to: determine, according to the destination address of the downlink packet, a group entry that is in the IP processing entry and corresponding to the destination address of the downlink packet, and execute an action entry of the group entry, where the action entry includes the destination address of the second paging message;

a change module 12052, configured to change the first paging message to the second paging message according to the action entry corresponding to the group entry, where the change module 12052 is further configured to change a destination address of the first paging message to the destination address, included in the action entry, of the second paging message, where the second paging message is the first paging message whose destination address has been changed according to the action entry; and a sending module 12053, configured to send the second paging message to the at least one base station.

After outputting the first paging message to the group entry of the location area corresponding to the UE and obtaining an address of a base station in the location area corresponding to the UE, the forwarding plane gateway sets, according to the group entry of the location area corresponding to the UE, the destination address of the first paging message outputted to the group entry to the address of the base station in the location area corresponding to the UE, so as to form the second paging message.

Changing the first paging message outputted to the group entry to the second paging message according to the action entry is changing the destination address of the first paging message to the destination address, included in the action entry, of the second paging message.

Specifically, a destination IP address of the first paging message outputted to the group entry is set to an IP address of the base station in the location area corresponding to the UE, and a source IP address of the first paging message outputted to the group entry is set to an IP address of the forwarding plane gateway; a destination MAC address of the first paging message outputted to the group entry is set to a MAC address of the base station in the location area corresponding to the UE, and a source MAC address of the first paging message outputted to the group entry is set to a MAC address of the forwarding plane gateway; and an output port is selected for the first paging message outputted to the group entry, and the output port is a port for connecting the forwarding plane gateway and the base station in the location area corresponding to the UE.

That is, the second paging message is the first paging message whose destination address has been changed according to the action entry.

Specifically, after the forwarding plane gateway sets, according to the group entry of the location area corresponding to the UE, the destination address of the first paging message outputted to the group entry to the address of the base station in the location area corresponding to the UE, the forwarding plane gateway sends the second paging message to the base station in the location area according to the address of the base station in the location area corresponding to the UE.

The second sending unit 1206 is configured to report a paging timeout event to the control plane gateway when an instruction sent by the control plane gateway for setting the IP processing entry is not received within a preset time, so that the control plane gateway sends, to the forwarding plane gateway, an instruction for deleting the IP processing entry of the terminal. The instruction for setting the IP processing entry is correspondingly generated by the control plane gateway according to a paging response message sent by the terminal, and the paging response message is correspondingly generated by the terminal according to the second paging message.

The fourth receiving unit 1207 is configured to: receive the instruction sent by the control plane gateway for deleting the IP processing entry of the terminal, delete the IP processing entry of the terminal according to the instruction for deleting the IP processing entry of the terminal, and release the downlink packet.

It may be learned from this embodiment that, after UE enters an idle state, a downlink packet directly triggers a forwarding plane gateway to send a second paging message to a base station, and the forwarding plane gateway does not need to instruct a control plane gateway to trigger a paging message. Therefore, signaling interworking between the control plane gateway and the forwarding plane gateway is reduced, and a paging delay is shortened.

Figure 13:
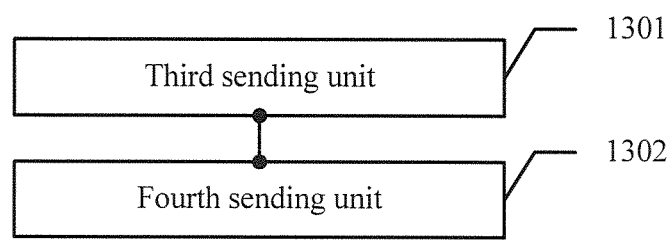
FIG. 13 is a schematic structural diagram of an example of embodiments of a control plane gateway device according to an embodiment of the present invention.

With reference to an embodiment shown in FIG. 13, the following further describes a structure of a control plane gateway device.

The control plane gateway device includes:

a third sending unit 1301, configured to send a group entry and an IP processing entry to a forwarding plane gateway, where the group entry is corresponding to the IP processing entry; and a fourth sending unit 1302, configured to send a first paging message to the forwarding plane gateway, so that the forwarding plane gateway changes the first paging message to a second paging message according to the group entry and the IP processing entry, where the second paging message is used for paging a terminal.

In the method according to this embodiment, a control plane gateway sends, to a forwarding plane gateway, a group entry and an IP processing entry corresponding to the group entry, and sends a first paging message. The forwarding plane gateway changes the first paging message to a second paging message according to the group entry and the IP processing entry, so that the forwarding plane gateway pages a terminal by using the second paging message, and a control plane gateway is not required to page the terminal. Therefore, a paging time is reduced.

Figure 14:
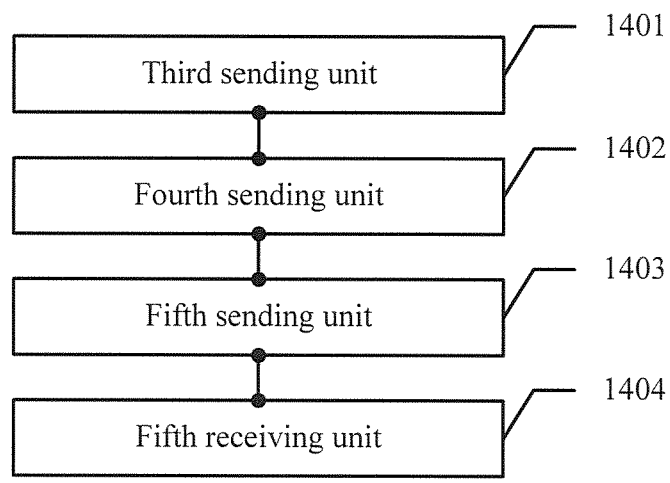
FIG. 14 is a schematic structural diagram of another example of embodiments of a control plane gateway device according to an embodiment of the present invention.

With reference to an embodiment shown in FIG. 14, the following further describes a specific structure of the control plane gateway device in detail.

The control plane gateway device specifically includes:

a third sending unit 1401, configured to send a group entry and an IP processing entry to a forwarding plane gateway, where the group entry is corresponding to the IP processing entry;

a fourth sending unit 1402, configured to send a first paging message to the forwarding plane gateway, so that the forwarding plane gateway changes the first paging message to a second paging message according to the group entry and the IP processing entry, where the second paging message is used for paging a terminal;

a fifth sending unit 1403, configured to send, to the forwarding plane gateway, an instruction for setting the IP processing entry, so that the forwarding plane gateway sets the action entry to outer tunnel encapsulation according to the instruction for setting the IP processing entry and associates the IP processing entry with an address of a terminal that receives the downlink packet; and a fifth receiving unit 1404, configured to: if a paging timeout event sent by the forwarding plane gateway is received, send, to the forwarding plane gateway, an instruction for deleting the IP processing entry, so that the forwarding plane gateway deletes the IP processing entry, where the paging timeout event is generated when the forwarding plane gateway does not receive, within a preset time, an instruction for setting the IP processing entry, and the instruction for setting the IP processing entry is used to instruct the forwarding plane gateway to set the action entry to outer tunnel encapsulation and associate the IP processing entry with an address of a terminal that receives the downlink packet.

It may be learned from this embodiment that, after UE enters an idle state, a downlink packet directly triggers a forwarding plane gateway to send a second paging message to a base station, and a control plane gateway instructs, by sending a group entry and an IP processing entry, the forwarding plane gateway to change a first paging message, so as to change the first paging message to the second paging message that is used for paging a terminal. The forwarding plane gateway does not need to instruct the control plane gateway to trigger a paging message. Therefore, signaling interworking between the control plane gateway and the forwarding plane gateway is reduced, and a paging delay is shortened.

Figure 15:
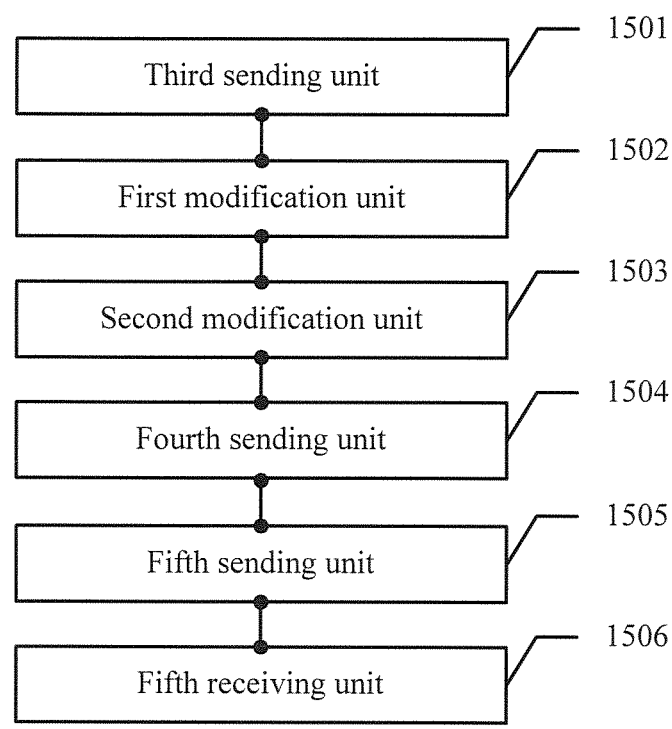
FIG. 15 is a schematic structural diagram of another example of embodiments of a control plane gateway device according to an embodiment of the present invention.

With reference to an embodiment shown in FIG. 15, the following further describes a specific structure of the control plane gateway device in detail.

A third sending unit 1501 is configured to send a group entry and an IP processing entry to a forwarding plane gateway, where the group entry is corresponding to the IP processing entry.

A first modification unit 1502 is configured to: if it is determined that a terminal moves from a current location area to an updated location area, modify an IP processing entry that is corresponding to the terminal located in the updated location area, so that the terminal located in the updated location area can be paged by using a group entry that is corresponding to the modified IP processing entry.

A second modification unit 1503 is configured to: if it is determined that a paging parameter of the terminal changes, modify an IP processing entry that is corresponding to the terminal whose paging parameter has changed, and update a first paging message buffered in the IP processing entry.

A fourth sending unit 1504 is configured to send the first paging message to the forwarding plane gateway, so that the forwarding plane gateway changes the first paging message to a second paging message according to the group entry and the IP processing entry. The second paging message is used for paging the terminal.

A fifth sending unit 1505 is configured to send, to the forwarding plane gateway, an instruction for setting the IP processing entry, so that the forwarding plane gateway sets the action entry to outer tunnel encapsulation according to the instruction for setting the IP processing entry and associates the IP processing entry with an address of a terminal that receives the downlink packet.

A fifth receiving unit 1506 is configured to: if a paging timeout event sent by the forwarding plane gateway is received, send, to the forwarding plane gateway, an instruction for deleting the IP processing entry, so that the forwarding plane gateway deletes the IP processing entry. The paging timeout event is generated when the forwarding plane gateway does not receive, within a preset time, an instruction for setting the IP processing entry, and the instruction for setting the IP processing entry is used to instruct the forwarding plane gateway to set the action entry to outer tunnel encapsulation and correlate the IP processing entry with an address of a terminal that receives the downlink packet.

It may be learned from this embodiment that, when UE moves from a current location area to an updated location area, a control plane gateway modifies an IP processing entry that is corresponding to a terminal located in the updated location area, so that the terminal located in the updated location area can be paged by using a group entry that is corresponding to the modified IP processing entry. In addition, after the UE enters an idle state, a downlink packet directly triggers a forwarding plane gateway to send a second paging message to a base station, and the control plane gateway instructs, by sending the group entry and the IP processing entry, the forwarding plane gateway to change a first paging message, so as to change the first paging message to the second paging message that is used for paging the terminal, so that the forwarding plane gateway pages, by using the second paging message, the terminal located in the updated location area, and the forwarding plane gateway does not need to instruct the control plane gateway to trigger a paging message. Therefore, signaling interworking between the control plane gateway and the forwarding plane gateway is reduced, and a paging delay is shortened.

An embodiment of the present invention further provides a system used for implementing a paging method. The system includes:

a base station located in each location area and a terminal that is located in the location area and connected to the base station, and the system further includes:

a forwarding plane gateway device and a control plane gateway device, where the forwarding plane gateway device is connected to the control plane gateway device, the forwarding plane gateway device is separately connected to the base station and the terminal, and the control plane gateway device is separately connected to the base station and the terminal.

For a specific structure and a working procedure of the forwarding plane gateway device, refer to the foregoing embodiments, and details are not described in this embodiment.

For a specific structure and a working procedure of the control plane gateway device, refer to the foregoing embodiments, and details are not described in this embodiment.

Figure 16:
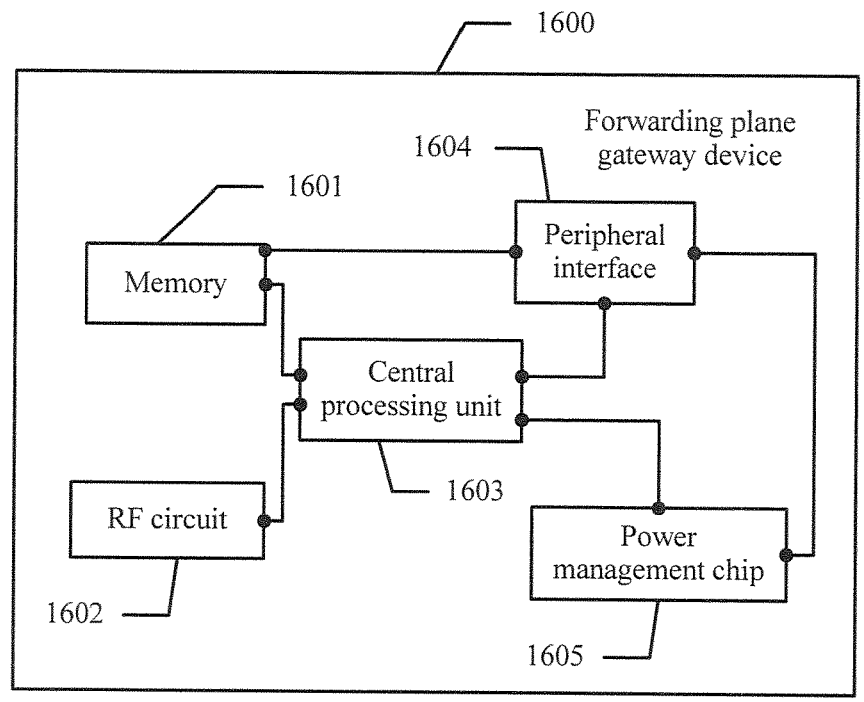
FIG. 16 is a schematic structural diagram of another example of embodiments of a forwarding plane gateway device according to an embodiment of the present invention.

The above describes the forwarding plane gateway device in the embodiments of the present invention from a perspective of function entities in a form of units, and the following specifically describes the forwarding plane gateway device in the embodiments of the present invention from a perspective of hardware processing. Referring to FIG. 16, another embodiment of a forwarding plane gateway device 1600 in an embodiment of the present invention includes the following.

It should be understood that the forwarding plane gateway device 1600 shown in the figure is merely an example, and the forwarding plane gateway device 1600 may have more or fewer components than components shown in the figure, may combine two or more components, or may have different component configurations. Each component shown in the figure may be implemented in hardware that includes one or more signal processing circuits and/or application-specific integrated circuits, software, or a combination of hardware and software.

It should be noted that the forwarding plane gateway device 1600 provided in this embodiment is merely an example of the forwarding plane gateway device. The forwarding plane gateway device related to this embodiment of the present invention may have more or fewer components than components shown in FIG. 16, may combine two or more components, or may have different component configurations or settings. Each component may be implemented in hardware that includes one or more signal processing circuits and/or application-specific integrated circuits, software, or a combination of hardware and software.

The following describes in detail the forwarding plane gateway device provided in this embodiment.

Memory 1601: The memory 1601 may be accessed by a central processing unit 1603, a peripheral interface 1604, and the like. The memory 1601 may include a high-speed random access memory, and may further include a non-volatile memory, for example, one or more magnetic disk storages, flash memories, or other volatile solid-state memories.

Peripheral interface 1604: The peripheral interface may connect input and output peripherals of the device to the central processing unit 1603 and the memory 1601.

RF circuit 1602: The RF circuit 1602 is mainly configured to: establish communication between a base station and a wireless network, that is, each forwarding plane gateway device connected to the wireless network, and implement data receiving and sending between the base station and the wireless network, for example, sending a control command. Specifically, the RF circuit 1602 receives and sends an RF signal. The RF signal is also referred to as an electromagnetic signal. The RF circuit 1602 converts an electrical signal into an electromagnetic signal or converts an electromagnetic signal into an electrical signal, and communicates with a communications network and another device by using the electromagnetic signal. The RF circuit 1602 may include a known circuit for implementing these functions, and includes but is not limited to an antenna system, an RF transceiver, one or more amplifiers, a tuner, one or more oscillators, a digital signal processor, a CODEC chip group, a subscriber identity module (Subscriber Identity Module, SIM), or the like. The RF circuit may be a WIFI circuit, or may be a Blue-tooth circuit, or may be an infrared circuit. This is not limited herein.

Power management chip 1605: The power management chip 1605 is configured to supply power to and manage power of the central processing unit 1603 and hardware that is connected to the peripheral interface.

The central processing unit 1603 specifically performs the following operations:

receiving a downlink packet; and sending a second paging message to at least one base station according to the downlink packet, where the second paging message is used for paging a terminal.

In other embodiments of the present invention, the central processing unit 1603 is further configured to perform the following operations:

receiving a first paging message sent by a control plane gateway; and determining a destination address of the second paging message according to a destination address of the downlink packet, and sending the second paging message to the at least one base station according to the destination address of the second paging message.

In other embodiments of the present invention, the central processing unit 1603 is further configured to perform the following operations:

receiving a group entry and an IP processing entry that are sent by the control plane gateway;

determining, according to the destination address of the downlink packet, a group entry that is in the IP processing entry and corresponding to the destination address of the downlink packet, and executing an action entry of the group entry, where the action entry includes the destination address of the second paging message;

changing the first paging message to the second paging message according to the action entry corresponding to the group entry; and sending the second paging message to the at least one base station.

In other embodiments of the present invention, the central processing unit 1603 is further configured to perform the following operation:

changing a destination address of the first paging message to the destination address, included in the action entry, of the second paging message, where the second paging message is the first paging message whose destination address has been changed according to the action entry.

In other embodiments of the present invention, the central processing unit 1603 is further configured to perform the following operation:

buffering the downlink packet.

In other embodiments of the present invention, the central processing unit 1603 is further configured to perform the following operation:

reporting a paging timeout event to the control plane gateway when an instruction sent by the control plane gateway for setting the IP processing entry is not received within a preset time, so that the control plane gateway sends, to the forwarding plane gateway, an instruction for deleting the IP processing entry of the terminal, where the instruction for setting the IP processing entry is correspondingly generated by the control plane gateway according to a paging response message sent by the terminal, and the paging response message is correspondingly generated by the terminal according to the second paging message; and receiving the instruction sent by the control plane gateway for deleting the IP processing entry of the terminal, deleting the IP processing entry of the terminal according to the instruction for deleting the IP processing entry of the terminal, and releasing the downlink packet.

Figure 17:
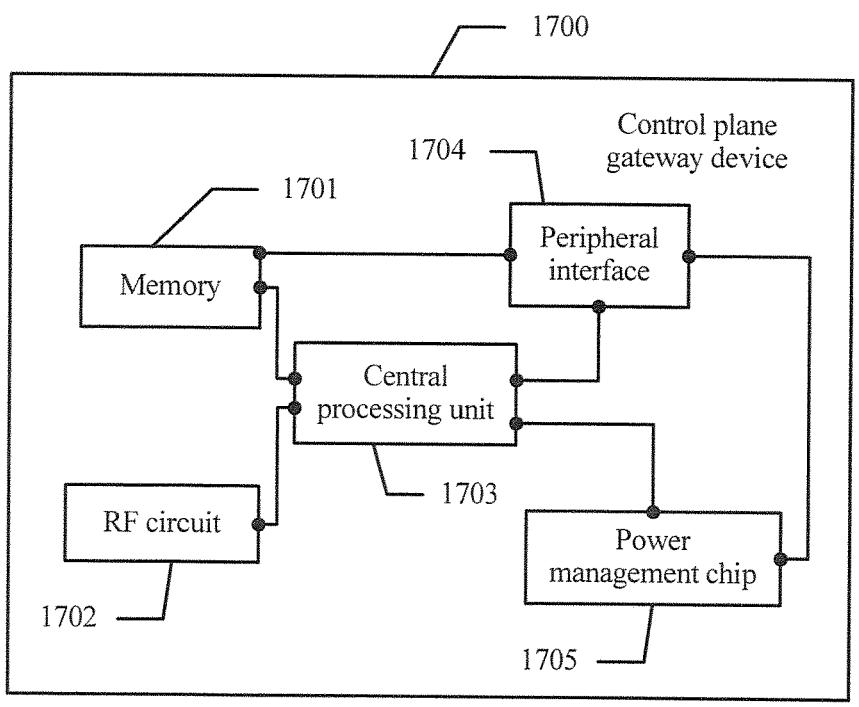
FIG. 17 is a schematic structural diagram of another example of embodiments of a control plane gateway device according to an embodiment of the present invention.

The above describes the control plane gateway device in the embodiments of the present invention from a perspective of function entities in a form of units, and the following specifically describes the control plane gateway device in the embodiments of the present invention from a perspective of hardware processing. Referring to FIG. 17, another embodiment of a control plane gateway device 1700 in an embodiment of the present invention includes the following.

It should be understood that the control plane gateway device 1700 shown in the figure is merely an example, and the control plane gateway device 1700 may have more or fewer components than the components shown in the figure, may combine two or more components, or may have different component configurations. Each component shown in the figure may be implemented in hardware that includes one or more signal processing circuits and/or application-specific integrated circuits, software, or a combination of hardware and software.

It should be noted that the control plane gateway device 1700 provided in this embodiment is merely an example of the control plane gateway device. The control plane gateway device related to this embodiment of the present invention may have more or fewer components than components shown in FIG. 17, may combine two or more components, or may have different component configurations or settings. Each component may be implemented in hardware that includes one or more signal processing circuits and/or application-specific integrated circuits, software, or a combination of hardware and software.

The following describes in detail the control plane gateway device provided in this embodiment.

Memory 1701: The memory 1701 may be accessed by a central processing unit 1703, a peripheral interface 1704, and the like. The memory 1701 may include a high-speed random access memory, and may further include a non-volatile memory, for example, one or more magnetic disk storages, flash memories, or other volatile solid-state memories.

Peripheral interface 1704: The peripheral interface may connect input and output peripherals of the device to the central processing unit 1703 and the memory 1701.

RF circuit 1702: The RF circuit 1702 is mainly configured to: establish communication between a base station and a wireless network, that is, each control plane gateway device connected to the wireless network, and implement data receiving and sending between the base station and the wireless network, for example, sending a control command. Specifically, the RF circuit 1702 receives and sends an RF signal. The RF signal is also referred to as an electromagnetic signal. The RF circuit 1702 converts an electrical signal into an electromagnetic signal or converts an electromagnetic signal into an electrical signal, and communicates with a communications network and another device by using the electromagnetic signal. The RF circuit 1702 may include a known circuit for implementing these functions, and includes but is not limited to an antenna system, an RF transceiver, one or more amplifiers, a tuner, one or more oscillators, a digital signal processor, a CODEC chip group, a subscriber identity module (SIM), or the like. The RF circuit may be a WIFI circuit, or may be a Blue-tooth circuit, or may be an infrared circuit. This is not limited herein.

Power management chip 1705: The power management chip 1705 is configured to supply power to and manage power of the central processing unit 1703 and hardware that is connected to the peripheral interface.

The central processing unit 1703 specifically performs the following operations:

sending a group entry and an IP processing entry to a forwarding plane gateway, where the group entry is corresponding to the IP processing entry; and sending a first paging message to the forwarding plane gateway, so that the forwarding plane gateway changes the first paging message to a second paging message according to the group entry and the IP processing entry, where the second paging message is used for paging a terminal.

In other embodiments of the present invention, the central processing unit 1703 is further configured to perform the following operation:

sending, to the forwarding plane gateway, an instruction for setting the IP processing entry, so that the forwarding plane gateway sets the action entry to outer tunnel encapsulation according to the instruction for setting the IP processing entry and associates the IP processing entry with an address of a terminal that receives the downlink packet.

In other embodiments of the present invention, the central processing unit 1703 is further configured to perform the following operation:

if a paging timeout event sent by the forwarding plane gateway is received, sending, to the forwarding plane gateway, an instruction for deleting the IP processing entry, so that the forwarding plane gateway deletes the IP processing entry, where the paging timeout event is generated when the forwarding plane gateway does not receive, within a preset time, an instruction for setting the IP processing entry, and the instruction for setting the IP processing entry is used to instruct the forwarding plane gateway to set the action entry to outer tunnel encapsulation and associate the IP processing entry with an address of a terminal that receives the downlink packet.

In other embodiments of the present invention, the central processing unit 1703 is further configured to perform the following operation:

if it is determined that the terminal moves from a current location area to an updated location area, modifying an IP processing entry that is corresponding to the terminal located in the updated location area, so that the terminal located in the updated location area can be paged by using a group entry that is corresponding to the modified IP processing entry.

In other embodiments of the present invention, the central processing unit 1703 is further configured to perform the following operations:

if it is determined that a paging parameter of the terminal changes, modifying an IP processing entry that is corresponding to the terminal whose paging parameter has changed, and updating a first paging message buffered in the IP processing entry.

The paging method, the related device, and the system according to the present invention are described in detail by using the foregoing embodiments. The description of the foregoing embodiments is only intended to help understand the method and core idea of the present invention. In addition, a person of ordinary skill in the art may make modifications to the specific implementation manners and the application scope based on the idea of the present invention. Therefore, the content of this specification shall not be construed as a limitation to the present invention.

What is claimed is:

1. A paging method, comprising:
   receiving, by a forwarding plane gateway, a first paging message sent by a control plane gateway;
   receiving, by the forwarding plane gateway, a group entry and an IP processing entry that are sent by the control plane gateway;
   receiving, by the forwarding plane gateway, a downlink packet;
   sending, by the forwarding plane gateway, a second paging message to at least one base station according to the downlink packet, wherein sending the second paging message comprises:
      determining, by the forwarding plane gateway according to a destination address of the downlink packet, a group entry that is in the IP processing entry and corresponding to the destination address of the downlink packet, and executing an action entry of the group entry, wherein the action entry comprises a destination address of the second paging message, changing, by the forwarding plane gateway, the first paging message to the second paging message according to the action entry corresponding to the group entry, and sending, by the forwarding plane gateway, the second paging message to the at least one base station.

2. The paging method according to claim 1, wherein changing the first paging message to the second paging message according to the action entry corresponding to the group entry comprises:

changing a destination address of the first paging message to the destination address, comprised in the action entry, of the second paging message, wherein the second paging message is the first paging message whose destination address has been changed according to the action entry.

3. The paging method according to claim 1, wherein:

the IP processing entry comprises a match entry and a group entry identifier, the match entry is configured to match the IP processing entry according to the destination address of the downlink packet, and the group entry identifier is configured to indicate a correspondence between the group entry and the IP processing entry.

4. A paging method, comprising:

receiving, by a forwarding plane gateway, a downlink packet;

sending, by the forwarding plane gateway, a second paging message to at least one base station according to the downlink packet, wherein sending the second paging message comprises:

determining, by the forwarding plane gateway, a destination address of the second paging message according to a destination address of the downlink packet, and sending the second paging message to the at least one base station according to the destination address of the second paging message;

reporting, by the forwarding plane gateway, a paging timeout event to a control plane gateway when the forwarding plane gateway does not receive, within a preset time, an instruction sent by the control plane gateway for setting the IP processing entry, to enable the control plane gateway to send, to the forwarding plane gateway, an instruction for deleting an IP processing entry of a terminal, wherein the instruction for setting the IP processing entry is correspondingly generated by the control plane gateway according to a paging response message sent by the terminal, and the paging response message is correspondingly generated by the terminal according to the second paging message; and receiving, by the forwarding plane gateway, the instruction sent by the control plane gateway for deleting the IP processing entry of the terminal, deleting the IP processing entry of the terminal according to the instruction for deleting the IP processing entry of the terminal, and releasing the downlink packet.

5. A paging method, comprising:

sending, by a control plane gateway, a group entry and an IP processing entry to a forwarding plane gateway, wherein the group entry is corresponding to the IP processing entry;

sending, by the control plane gateway, a first paging message to the forwarding plane gateway, to enable the forwarding plane gateway to change the first paging message to a second paging message according to the group entry and the IP processing entry; and wherein:

the group entry comprises an action entry and a group entry identifier that is configured to index the group entry, the action entry enables the forwarding plane gateway to change the first paging message to the second paging message, so that a destination address of the first paging message is changed to a destination address, comprised in the action entry, of the second paging message, the second paging message is the first paging message whose destination address has been changed according to the action entry, and the action entry comprises the destination address of the second paging message, to enable the forwarding plane gateway to send the second paging message to at least one base station according to the destination address of the second paging message.

6. The paging method according to claim 5, wherein the IP processing entry comprises a match entry and the group entry identifier, the match entry is configured to enable the forwarding plane gateway to match the IP processing entry according to a destination address of a downlink packet, and the group entry identifier is configured to indicate a correspondence between the group entry and the IP processing entry.

7. The paging method according to claim 5, wherein after sending the first paging message, the method further comprises:

sending, to the forwarding plane gateway by the control plane gateway, an instruction for setting the IP processing entry, to enable the forwarding plane gateway to set the action entry to outer tunnel encapsulation according to the instruction for setting the IP processing entry.

8. The paging method according to claim 5, further comprising:

when the control plane gateway determines that a terminal moves from a current location area to an updated location area, modifying, by the control plane gateway, an IP processing entry that is corresponding to the terminal located in the updated location area, so that the terminal located in the updated location area can be paged by using a group entry that is corresponding to the modified IP processing entry.

9. A forwarding plane gateway device, comprising:

a peripheral interface configured to:

receive a group entry and an IP processing entry that are sent by a control plane gateway, and receive a downlink packet;

a processor configured to:

determine a destination address of a second paging message according to a destination address of the downlink packet, determine, according to the destination address of the downlink packet, a group entry that is in the IP processing entry and corresponding to the destination address of the downlink packet, execute an action entry of the group entry, wherein the action entry comprises the destination address of the second paging message, and change the first paging message to the second paging message according to the action entry corresponding to the group entry; and wherein the peripheral interface is further configured to send the second paging message to at least one base station according to the destination address of the second paging message.

10. The forwarding plane gateway device according to claim 9, wherein the processor is further configured to change a destination address of the first paging message to the destination address, comprised in the action entry, of the second paging message, wherein the second paging message is the first paging message whose destination address has been changed according to the action entry.

11. The forwarding plane gateway device according to claim 9, further comprising a memory configured to buffer the downlink packet.

12. A forwarding plane gateway device, comprising:
a peripheral interface configured to receive a downlink packet;
a processor configured to determine a destination address of a second paging message according to a destination address of the downlink packet;
wherein the peripheral interface is further configured to:
send the second paging message to at least one base station according to the destination address of the second paging message, and
report a paging timeout event to a control plane gateway when an instruction sent by the control plane gateway for setting an IP processing entry is not received within a preset time, to enable the control plane gateway to send, to the forwarding plane gateway, an instruction for deleting an IP processing entry of a terminal, wherein the instruction for setting the IP processing entry is correspondingly generated by the control plane gateway according to a paging response message sent by the terminal, and the paging response message is correspondingly generated by the terminal according to the second paging message; and receive the instruction sent by the control plane gateway for deleting the IP processing entry of the terminal; and
the processor is further configured to delete the IP processing entry of the terminal according to the instruction for deleting the IP processing entry of the terminal, and release the downlink packet.

13. A control plane gateway device, comprising:
a processor;
a peripheral interface; and
a non-transitory memory storing a program that, when executed by the processor, causes the device to:
send a group entry and an IP processing entry to a forwarding plane gateway, wherein the group entry is corresponding to the IP processing entry,
send a first paging message to the forwarding plane gateway, to enable the forwarding plane gateway to change the first paging message to a second paging message according to the group entry and the IP processing entry, and
when a paging timeout event sent by the forwarding plane gateway is received, send, to the forwarding plane gateway, an instruction for deleting the IP processing entry, to enable the forwarding plane gateway to delete the IP processing entry, wherein the paging timeout event is generated when the forwarding plane gateway does not receive, within a preset time, an instruction for setting the IP processing entry.

14. The control plane gateway device according to claim 13, wherein the program, when executed by the processor, further causes the device to:
send, to the forwarding plane gateway, the instruction for setting the IP processing entry, to enable the forwarding plane gateway to set an action entry to outer tunnel encapsulation according to the instruction for setting the IP processing entry and associating the IP processing entry with an address of a terminal that receives the downlink packet.

15. The control plane gateway device according to claim 13, wherein the program, when executed by the processor, further causes the device to:
when the terminal moves from a current location area to an updated location area, modify an IP processing entry that is corresponding to the terminal located in the updated location area, to enable a terminal located in the updated location area to be paged by using a group entry that is corresponding to the modified IP processing entry.

16. The control plane gateway device according to claim 13, wherein the program, when executed by the processor, further causes the device to:
when a paging parameter of the terminal changes, modify an IP processing entry that is corresponding to a terminal whose paging parameter has changed, and updating a first paging message buffered in the IP processing entry.

* * * * *